United States Patent
Nakagawa et al.

(10) Patent No.: US 11,750,358 B2
(45) Date of Patent: Sep. 5, 2023

(54) TIME TRANSMISSION DEVICE AND TRANSMISSION METHOD

(71) Applicant: Nippon Telegraph and Telephone Corporation, Tokyo (JP)

(72) Inventors: Masahiro Nakagawa, Musashino (JP); Kaoru Arai, Musashino (JP); Hiroki Sakuma, Musashino (JP); Shunichi Tsuboi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 72 days.

(21) Appl. No.: 17/431,576

(22) PCT Filed: Feb. 13, 2020

(86) PCT No.: PCT/JP2020/005637
§ 371 (c)(1),
(2) Date: Aug. 17, 2021

(87) PCT Pub. No.: WO2020/170947
PCT Pub. Date: Aug. 27, 2020

(65) Prior Publication Data
US 2022/0140991 A1 May 5, 2022

(30) Foreign Application Priority Data
Feb. 21, 2019 (JP) ................. 2019-029897

(51) Int. Cl.
*H04B 10/07* (2013.01)
*H04L 7/00* (2006.01)
*H04B 10/077* (2013.01)

(52) U.S. Cl.
CPC ....... *H04L 7/0075* (2013.01); *H04B 10/0775* (2013.01)

(58) Field of Classification Search
CPC . H04B 10/0775; H04B 10/071; H04L 7/0075; H04L 7/0033
See application file for complete search history.

(56) References Cited

U.S. PATENT DOCUMENTS 11,171,728 B2 * 11/2021 Swanson ................. H04L 43/16
2007/0127919 A1 * 6/2007 Kallstenius .......... H04B 10/071
398/25

(Continued)

FOREIGN PATENT DOCUMENTS

JP 2014216669 11/2014
JP 2015065525 4/2015

(Continued)

OTHER PUBLICATIONS

[No Author Listed], "IEEE Standard for a Precision Clock Synchronization Protocol for Networked Measurement and Control Systems," IEEE Std 1588TM-2008 (Revision of IEEE Std 1588-2002), Jul. 24, 2008, 290 pages.

*Primary Examiner* — Dzung D Tran
(74) *Attorney, Agent, or Firm* — Fish & Richardson P.C.

(57) ABSTRACT

An optical transmission device of each node simultaneously sends a plurality of signals having different wavelengths as delay measurement signals to a transmission path. The optical transmission device determines a delay value that reflects a propagation delay calculated based on an arrival time difference between a plurality of wavelengths in a signal received from another node, and determines a waiting time amount based on the delay value and the propagation delay. The optical transmission device notifies the other node of the delay value. Each optical transmission device outputs the received signal from the other node with a delay of the waiting time amount. The optical transmission device generates an optical intermittent signal obtained by selecting and multiplexing any of time information, the delay mea- (Continued)

surement signal, and communication information. A reception side extracts a desired multiplexed signal from the received optical intermittent signals.

17 Claims, 18 Drawing Sheets

(56) References Cited

U.S. PATENT DOCUMENTS

| | | | | |
|---|---|---|---|---|
| 2015/0085852 | A1* | 3/2015 | Mizutani | H04L 43/0852 |
| | | | | 370/350 |
| 2015/0104167 | A1* | 4/2015 | Bottari | H04B 10/2513 |
| | | | | 398/16 |
| 2018/0359027 | A1* | 12/2018 | Brzozowski | H04B 10/25 |

FOREIGN PATENT DOCUMENTS

| | | |
|---|---|---|
| JP | 2016143901 | 8/2016 |
| JP | 2018098557 | 6/2018 |

* cited by examiner

TIME TRANSMISSION DEVICE AND TRANSMISSION METHOD

CROSS-REFERENCE TO RELATED APPLICATIONS

This application is a National Stage application under 35 U.S.C. § 371 of International Application No. PCT/JP2020/005637, having an International Filing Date of Feb. 13, 2020, which claims priority to Japanese Application Serial No. 2019-029897, filed on Feb. 21, 2019. The disclosure of the prior application is considered part of the disclosure of this application, and is incorporated in its entirety into this application.

TECHNICAL FIELD

The present invention relates to a time transmission device and a transmission method.

BACKGROUND ART

Time synchronization technology will be required in the future for next-generation mobile communication 5G (Generation) or the like in inter-base-station cooperation that is applied to mobile wireless communication systems. A time synchronization system is realized by, for example, a configuration in which grand masters (GMs), which are time reference devices, are distributed and disposed at different points. A GM at each point functions as a global navigation satellite system (GNSS) receiver that directly receives a signal from a GNSS satellite, and directly distributes the received signal to an end application.

However, when the number of high-performance GNSS receivers is increased, a cost increases accordingly. Further, the accuracy of time deteriorates in a time period in which signals from the satellite cannot be received due to bad weather.

Thus, time information from the GM is distributed to each node via a packet network. That is, a form in which each node indirectly receives a GNSS signal is used. For example, precision time protocol (PTP) for performing time synchronization using a time stamp of a packet is used (Non Patent Literature 1). In PTP, the time synchronization is performed via a highly reliable network of a telecommunications carrier.

Thus, reception points of GNSS antennas serving as time references and the number of installed GNSS antennas can be aggregated, and the reliability of GNSS reception can be improved by an aggregated GNSS receiver (GM) having a monitoring function. Further, the reliability can also be improved by path duplication of a packet network. Further, the PTP packet and other data packets are superimposed on the same packet network. That is, the same packet network can be shared by a plurality of services, and time information can be transferred economically and with high accuracy.

FIG. 22 illustrates a configuration example of a time transmission system to which the time synchronization technology is applied. In the time transmission system of FIG. 22, a GM node 82z, which is a PTP node corresponding to PTP, boundary clock (BC) nodes 83z and 84z, and an ordinary clock (OC) node 85z are connected by a network.

When PTP is applied to a time transmission system illustrated in FIG. 22, the relationship between PTP nodes that directly perform time synchronization is expressed such that a node that provides time information is as a master node 91z illustrated in FIG. 23, and a synchronized device receiving the time information from this master node 91z is a slave node 92z illustrated in FIG. 23.

In FIGS. 22 and 23, an order of propagation of the time information is indicated by thick arrows. A source side of the thick arrow is an upstream side, and a destination side of the thick arrow is a downstream side. That is, accurate time information is propagated downstream in order of GM node 82z→BC node 83z→BC node 84z→OC node 85z.

The GM node 82z includes an antenna 82a that directly receives a signal from the GPS satellite 81.

The BC node 83z is the slave node 92z that receives time information from its master node 91z, which is the GM node 82z, and then functions as the master node 91z that provides time information to the BC node 84z.

The BC node 84z is the slave node 92z that receives time information from the BC node 83z, and then functions as the master node 91z that provides time information to the OC node 85z. The OC node 85z is the slave node 92z that receives time information from the BC node 84z, and then provides the time information to the end terminal 86z.

Names of the BC nodes 83z and 84z and the OC node 85z are different because a plurality of connection ports to other PTP nodes are present in the BC nodes 83z and 84z but only one connection port is present in the OC node 85z.

A general processing procedure when PTP is applied is illustrated in FIG. 23. The PTP packet to which a time stamp is imparted as the time information is transmitted and received between the master node 91z and the slave node 92z as illustrated in FIG. 23. That is, a downstream Sync message (S11z), a downstream Follow-up message (S12z), an upstream Delay_Request message (S13z), and a downstream Delay_Response message (S14z) are sequentially transmitted and received as PTP packets.

A departure time t1 is a time at which the Sync message (S11z) is transmitted from the master node 91z. Because it is difficult for the departure time t1 of the Sync message to be included in the Sync message itself, the slave node 92z is notified of the departure time t1 of the Sync message in the subsequent Follow-up message.

An arrival time t2 is a time at which the Sync message arrives at the slave node 92z. A departure time t3 is a time at which a Delay_Request message is transmitted from the slave node 92z.

An arrival time t4 is a time at which the Delay_Request message arrives at the master node 91z. The arrival time t4 is included in the Delay_Response message with respect to the Delay_Request message and is notified to the slave node 92z.

Thus, the slave node 92z can ascertain all four time stamps (the departure time t1 to the arrival time t4).

The following propagation delay occurs in transmission and reception of the PTP packet as illustrated in FIG. 23.

A downstream delay Dms is a propagation delay of the Sync message in a downstream direction from the master node 91z to the slave node 92z. Assuming that a deviation of a clock on the slave node 92z side with respect to a clock on the master node 91z side is an offset value, the downstream delay Dms can be obtained using Equation (1) below.

$$Dms = (t2 - Voffset) - t1 \qquad (1)$$

t2: Arrival time
Voffset: Offset value
t1: Departure time

An upstream delay Dsm is a propagation delay of the Delay_Request message in an upstream direction from the slave node 92z to the master node 91z. The upstream delay Dsm can be calculated using Equation (2) below.

$$Dsm = t4 - (t3 - Voffset) \qquad (2)$$

t4: Departure time
t3: Arrival time

Here, assuming that the downstream delay Dms and the upstream delay Dsm are equal, the slave node 92z can obtain an offset value Voffset using Equation (3) below.

$$Voffset=((t2-t1)-(t4-t3))/2 \qquad (3)$$

Thus, the slave node 92z corrects a time of its own clock with the offset value obtained using Equation (3) above. Thus, the clock of the master node 91z and the clock of the slave node 92z are synchronized and the times of both match.

CITATION LIST

Non Patent Literature

Non Patent Literature 1: IEEE (The Institute of Electrical and Electronics Engineers, Inc), "IEEE Standard for a Precision Clock Synchronization Protocol for Networked Measurement and Control Systems", IEEE Std 1588-2008, Revision of IEEE Std 1588-2002, Jul. 24, 2008

SUMMARY OF THE INVENTION

Technical Problem

The above-described PTP shown in Non Patent Literature 1 is based on the premise that upstream and downstream delays are equal. However, in reality, various error factors such as (1) to (4) shown below can be considered.

(1) An influence of buffering due to packet processing in a device in the middle of the transmission path and variation delay due to frame processing can be considered.

(2) An optical path length physically changes due to a temperature variation in the transmission path, and the propagation delay fluctuates.

(3) When bidirectional communication is performed using a two-core optical transmission path, an error occurs according to a difference in length between two fibers in a vertical direction. In reality, an error of about five nanoseconds occurs per meter of the difference in length.

(4) When optical signals having wavelengths different upstream and downstream are used in a situation in which bidirectional communication is performed using a single-core optical transmission path, a delay difference occurs due to wavelength dispersion. For example, when a signal is transmitted over a distance of 80 [km] using a single mode fiber with two wavelengths of 1500 [nm] and 1300 [nm], a delay difference between these wavelengths is 130 [ns], and a time synchronization error of 65 [ns] that is half of 130 [ns] occurs in PTP. That is, when upstream and downstream link asymmetry occurs due to each of the above factors, a synchronization error due to an upstream and downstream delay difference occurs in a time offset in PTP.

Further, when an optical transmission device that performs time synchronization is configured, it is assumed that only a time synchronization device is connected to one transponder (TRPN) so that PTP packets are accommodated in order to avoid an influence of packet fluctuation. However, with this configuration, because a wavelength band that is used for transmission of PTP packets is occupied only by the PTP packets, wavelength band utilization efficiency becomes low. Further, because one pair of transponders is required for each ground, that is, for each node, there is a problem where the number of transponders required for the entire network and the number of used wavelengths increase according to the number of nodes.

The present invention has been made in view of the above circumstances, and an object of the present invention is to provide a time transmission device and a transmission method capable of reducing a time synchronization error caused by upstream and downstream asymmetry of a transmission path, improving wavelength band utilization efficiency, and reducing the required number of transponders.

Means for Solving the Problem (1) A time transmission device including an optical transmission unit connected to any node position on a transmission path in which bidirectional optical communication in downstream and upstream directions is possible, and a time synchronization unit configured to transmit, between a plurality of nodes, time information for correcting a time deviation between the plurality of nodes is provided, the time transmission device including: a delay measurement signal generation unit configured to simultaneously transmit a plurality of signals having different wavelengths as delay measurement signals to the transmission path; a delay management unit configured to determine a delay value reflecting a propagation delay calculated based on an arrival time difference between a plurality of wavelengths in the delay measurement signals received from another node of the plurality of nodes via the transmission path, and determine a waiting time amount based on the delay value and the propagation delay; a delay value notification unit configured to notify the other node of the plurality of nodes of the delay value; a variable delay unit configured to output signals received from the other node of the plurality of nodes via the transmission path with a delay of the waiting time amount; an intermittent signal generation unit configured to generate an optical intermittent signal obtained by periodically selecting and multiplexing at least any of the time information, the delay measurement signal, and desired communication information using one or more of a plurality of wavelengths; and a signal identification unit configured to extract a desired multiplexed signal from the optical intermittent signals included in a received signal.

According to this time transmission device, because the arrival time difference between the plurality of wavelengths in the delay measurement signal received by the delay management unit is detected, it is possible to correct an error due to the upstream and downstream asymmetry of the transmission path when a plurality of wavelengths are used. Further, it is possible to determine an appropriate waiting time amount in consideration of the propagation delay calculated based on this arrival time difference. Further, because the variable delay unit outputs a signal received from another node via the transmission path with a delay of the waiting time amount, it is possible to simultaneously output a plurality of signals having different arrival times at the same timing. Further, because the intermittent signal generation unit generates the optical intermittent signal obtained by periodically selecting and multiplexing at least any of the time information, the delay measurement signal, and the desired communication information using one or more of the plurality of wavelengths, it is possible to share each wavelength in order to transmit a plurality of types of signals, and wavelength band utilization efficiency is improved. Further, because the signal identification unit extracts a desired multiplexed signal from the optical intermittent signals included in the received signal, it is possible to transmit a signal to be used for purposes other than time synchronization using the same wavelength as that of a time synchronization signal. Further, this makes it possible to reduce the number of required transponders.

(2) The time transmission device according to (1) is provided, wherein the intermittent signal generation unit reflects a difference in priority by signals to be transmitted and buffers and multiplexes a plurality of types of input signals.

According to this time transmission device, since the intermittent signal generation unit considers the difference in priority by signals to be transmitted, it is possible to realize appropriate control. For example, it is possible to shorten a delay time of time synchronization information having a high priority as compared with other types of signals according to a difference in buffering, and to improve the accuracy of the time synchronization.

(3) The time transmission device according to (1) is provided, further including: a broadcast communication signal processing unit configured to allow connection with a broadcast communication device configured to generate broadcast communication information a destination of which is each of the other nodes of the plurality of nodes, wherein the delay management unit manages the propagation delay and the delay value independently of each other for each of the other nodes of the plurality of nodes.

According to this time transmission device, it is possible to perform transmission of a time synchronization signal and transmission of broadcast communication information in a form in which the same wavelength is shared. Further, because the delay management unit manages the propagation delay and the delay value for each node independently, it is possible to perform control, for example, so that the same broadcast communication information arrives at a plurality of destination-side nodes at the same timing, and it becomes easy to realize signal transmission suitable for transmission of the broadcast communication information.

(4) The time transmission device according to (1) is provided, wherein a plurality of independent synchronization modules, each including the delay measurement signal generation unit, the delay management unit, and the variable delay unit, are connected to the plurality of nodes, respectively, a first synchronization module is connected to a master node, a second synchronization module is connected to a plurality of slave nodes, and the first synchronization module manages the propagation delay and the delay value of the second synchronization module at each of the plurality of slave nodes.

According to this time transmission device, because the first synchronization module on the master side can ascertain the propagation delay and the delay value of each node on the slave side, it is possible for the master side to appropriately control a timing at which a signal arrives at each node on the slave side. This makes it possible to distribute, for example, broadcast distribution type service traffic to each slave node at a desired timing.

(5) The time transmission device according to (4) is provided, wherein the first synchronization module and a plurality of the second synchronization modules are connected to each other via the transmission path formed in a ring shape.

According to this time transmitting device, because the transmission path formed in a ring shape is used, it is possible to connect a large number of transmission devices to a common transmission path and it becomes easy to accommodate broadcast communication such as a broadcasting type service, for example.

(6) The time transmission device according to (4) is provided, wherein the first synchronization module collects information on the propagation delay with respect to a signal in a direction from the master node to each of the plurality of slave node, from each of the second synchronization modules, the first synchronization module calculates, by itself, information on the propagation delay with respect to a signal in a direction from each of the plurality of slave nodes to the master node for each of the plurality of slave nodes, and the first synchronization module notifies each of the second synchronization modules of information on the waiting time amount calculated based on the propagation delay by types of signal to be transmitted.

According to this time transmission device, it is possible for a node on the master side to ascertain a propagation delay with respect to a signal in a downstream direction from the master node to each slave node and the propagation delay with respect to a signal in an upstream direction from each slave node to the master node. Further, by notifying each node on the slave side of an appropriate waiting time amount, it becomes easy for the master side to perform control so that the signal arriving at each slave node is processed at a desired timing.

(7) The time transmission device according to (6) is provided, wherein the second synchronization module determines a delay time in the variable delay unit by types of signal to be received, based on the information on the waiting time amount which the first synchronization module notifies the second synchronization module of.

According to this time transmission device, it becomes easy to perform control so that the signal arriving at each slave node is processed at an appropriate timing for each type of signal. In the case of transmission of a time synchronization signal, it is possible to perform control such that delays in the upstream and downstream directions are symmetrical, and in the case of broadcast communication, it is possible to adjust a delay time such that arrival timings at all slave nodes are aligned.

(8) A transmission method for transmitting time information for correcting a time deviation between a plurality of nodes between a plurality of optical transmission devices connected to any node position on a transmission path in which bidirectional optical communication in downstream and upstream directions is possible is provided, the transmission method including: simultaneously transmitting, by an optical transmission device of the plurality of nodes at its own node position, a plurality of signals having different wavelengths as delay measurement signals to the transmission path; determining, by an optical transmission device of the plurality of optical transmission devices that is connected to at least one node, a waiting time amount based on a delay value and a propagation delay by determining the delay value reflecting the propagation delay calculated based on an arrival time difference between a plurality of wavelengths in the delay measurement signals received from another node of the plurality of nodes via the transmission path; notifying, by the optical transmission device of the plurality of optical transmission devices that is connected to at least one node, the other node of the plurality of nodes of the delay value; outputting, by the optical transmission device of the plurality of nodes at its own node position, signals received from the other node of the plurality of nodes via the transmission path with a delay of the waiting time amount; generating, by the optical transmission device of the plurality of optical transmission devices that is connected to at least one node, an intermittent signal obtained by periodically selecting and multiplexing at least any of the time information, the delay measurement signal, and desired communication information using one or more of a plurality of wavelengths; and extracting a desired multiplexed signal from the intermittent signals included in a received signal.

According to this transmission method, because the arrival time difference between the plurality of wavelengths in the received delay measurement signal is detected in each node on the reception side, it is possible to correct an error due to the upstream and downstream asymmetry of the transmission path when a plurality of wavelengths are used. Further, it is possible to determine an appropriate waiting time amount in consideration of the propagation delay calculated based on this arrival time difference. Further, because each node on the reception side outputs a signal received from another node via the transmission path with a delay of the waiting time amount, it is possible to simultaneously output a plurality of signals having different arrival times at the same timing. Further, because the node on the transmission side generates the optical intermittent signal obtained by periodically selecting and multiplexing at least any of the time information, the delay measurement signal, and the desired communication information using one or more of the plurality of wavelengths, it is possible to share each wavelength in order to transmit a plurality of types of signals, and wavelength band utilization efficiency is improved. Further, because the node on the reception side extracts a desired multiplexed signal from the optical intermittent signals included in the received signal, it is possible to transmit a signal to be used for purposes other than time synchronization using the same wavelength as that of a time synchronization signal. Further, this makes it possible to reduce the number of required transponders.

Effects of the Invention

According to the time transmission device and the transmission method of the present invention, it is possible to reduce a time synchronization error caused by upstream and downstream asymmetry of the transmission path, improve wavelength band utilization efficiency, and reduce the required number of transponders.

DESCRIPTION OF EMBODIMENTS

Embodiments of the present invention will be described below with reference to each figure.

Configuration Example (1) of Communication System

Figure 1:
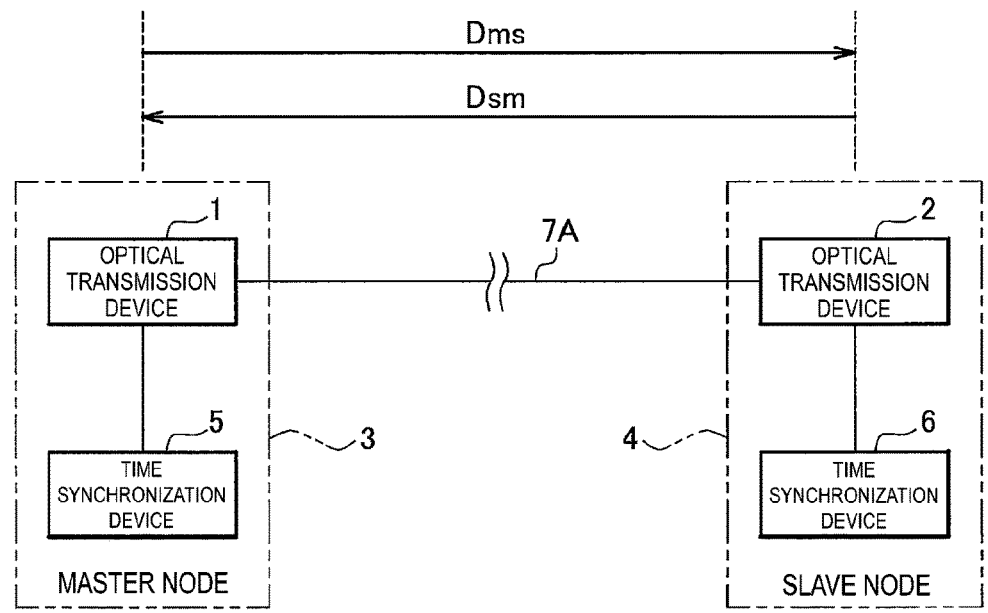
FIG. 1 is a block diagram illustrating a configuration example (1) of a communication system.

A basic configuration example of the communication system is illustrated in FIG. 1.

In the communication system illustrated in FIG. 1, a master node 3 and a slave node 4 are physically connected via an optical transmission path 7A. The optical transmission path 7A is an optical fiber including one or two or more core wires.

In the example of FIG. 1, the optical transmission device 1 is installed at a position of the master node 3, and the optical transmission device 2 is connected at a position of the slave node 4. An optical signal can be bidirectionally transmitted between the optical transmission device 1 and the optical transmission device 2 via the optical transmission path 7A.

Further, when there is only one core wire of the optical transmission path 7A, a wavelength division multiplexing (WDM) function is installed in each of the optical transmission devices 1 and 2 in order to secure a transmission path in a downstream direction from the optical transmission device 1 to the optical transmission device 2 and a transmission path in an upstream direction from the optical transmission device 2 to the optical transmission device 1 individually and independently. Each wavelength is determined so that a difference occurs between a wavelength of laser light used for signal transmission in the downstream direction and a wavelength of laser light used for signal transmission in an upstream direction. For example, the wavelength in the downstream direction is 1500 [nm], and the wavelength in the upstream direction is 1300 [nm].

In the example of FIG. 1, a time synchronization device 5 is connected to the optical transmission device 1 of the master node 3, and a time synchronization device 6 is connected to the optical transmission device 2 of the slave node 4. These time synchronization devices 5 and 6 correspond to, for example, BC nodes 83z and 84z illustrated in FIG. 22.

That is, the time synchronization device 5 of the master node 3 can receive accurate time information from the GM node 82z and distribute the accurate time information to the optical transmission device 1 to synchronize a time of the optical transmission device 1. Further, the time synchronization device 6 of the slave node 4 can receive accurate time information from the GM node 82z, for example, via the time synchronization device 5—optical transmission device 1—optical transmission path 7A—optical transmission device 2, and use this time to time-synchronize the optical transmission device 2.

However, because a distance between the positions of the master node 3 and the slave node 4 both working as bases is assumed to be, for example, about several tens of [km], a relatively large propagation delay occurs in the optical transmission path 7A. Thus, a deviation occurs between the time of the time synchronization device 5 and the time of the time synchronization device 6 due to a transmission delay.

Actually, a transmission delay time of the optical transmission path 7A can be calculated as a sum of a delay according to an optical path length and an in-device delay, the delay according to an optical path length being determined using a sum of an "inter-station transmission path", the "in-station wiring" and "in-device wiring". Specifically, a time deviation of 5 [ns] occurs with respect to a deviation of 1 [m] in the optical path length. In addition, an actual optical path length fluctuates under an influence of temperature.

The time deviation between the master node 3 and the slave node 4 as described above can be corrected by applying the PTP shown in Non Patent Literature 1. However, PTP does not consider the upstream and downstream asymmetry of the transmission path in principle. Thus, when optical path lengths of the upstream and downstream transmission paths are different, an error occurs in time synchronization between the master node 3 and the slave node 4.

Further, when transmission is performed using optical signals having different wavelengths upstream and downstream, a delay difference occurs due to wavelength dispersion, and thus the properties of upstream and downstream transmission paths become asymmetric in this case as well. An error occurs in the time synchronization between the master node 3 and the slave node 4. For example, when a signal is transmitted over a distance of 80 [km] using a single mode fiber with two wavelengths of 1500 [nm] and 1300 [nm], a delay difference between these wavelengths is 130 [ns], and a time synchronization error of 65 [ns] that is half of 130 [ns] occurs in PTP.

In the time transmission device and the transmission method of the present invention, it is possible to realize a function for greatly reducing the time synchronization error between the master node 3 and the slave node 4 even when properties of the upstream and downstream transmission paths are asymmetrical, as in a case in which there is a difference in the optical path length of the optical transmission path 7A between upstream and downstream, and/or a case in which transmission is performed using optical signals having different wavelengths upstream and downstream.

Figure 2:
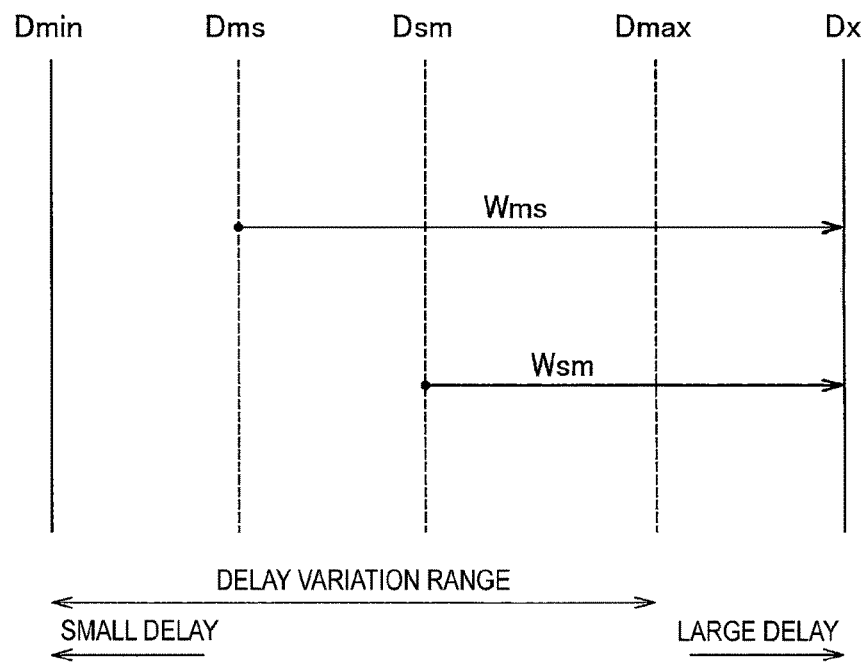
FIG. 2 is a schematic diagram illustrating an example of a delay time and a waiting time of each unit.

Method of Improving Accuracy of Time Synchronization in Consideration of Upstream and Downstream Asymmetry FIG. 2 illustrates an example of a delay time and a waiting time of each unit in a communication system like that illustrated in FIG. 1.

In FIG. 2, a propagation delay Dms indicates a propagation delay time of an optical signal in one direction that is transmitted from the optical transmission device 1 on the master node 3 side to the optical transmission device 2 on the slave node 4 side in the communication system of FIG. 1. Further, the propagation delay Dsm indicates a propagation delay time of an optical signal in one direction transmitted from the optical transmission device 2 on the slave node 4 side to the optical transmission device 1 on the master node 3 side.

For example, when there is a difference between upstream and downstream optical path lengths in the optical transmission path 7A illustrated in FIG. 1 or when optical signals having different wavelengths upstream and downstream are used, a difference occurs between the propagation delays Dms and Dsm as illustrated in FIG. 2. Further, when an actual optical path length of the optical transmission path 7A fluctuates due to an influence of temperature change, the propagation delays Dms and Dsm also fluctuate accordingly.

Thus, it is assumed that the actual propagation delays Dms and Dsm fluctuate within a certain range. For example, the propagation delays Dms and Dsm fluctuate with a width between a minimum delay Dmin and a maximum delay Dmax illustrated in FIG. 2. A difference between the propagation delays Dms and Dsm causes an error in time synchronization.

Thus, when the present invention is implemented, a particular set delay Dx sufficiently larger than the maximum delay Dmax is assigned as illustrated in FIG. 2. Further, waiting time amounts Wms and Wsm on the reception side are assigned using Equations (4) and (5) below according to the set delay Dx.

$$Wms = Dx - Dms \quad (4)$$

$$Wsm = Dx - Dsm \quad (5)$$

However, because the propagation delays Dms and Dsm are expected to fluctuate due to a temperature change or the like, it is necessary to measure the propagation delays Dms and Dsm periodically and correct the waiting time amounts Wms and Wsm, for example.

For example, an optical signal transmitted from the optical transmission device 1 to the optical transmission path 7A at a certain time t0 arrives at the optical transmission device 2 with a delay of the propagation delay Dms. Thus, the optical transmission device 2 queues the optical signal received from the optical transmission path 7A with an internal delay of the waiting time amount Wms inside the optical transmission device 2, so that the total delay can match the set delay Dx.

Further, the optical signal transmitted from the optical transmission device 2 to the optical transmission path 7A at time t0 arrives at the optical transmission device 1 with a delay of the propagation delay Dsm. Thus, the optical transmission device 1 queues the optical signal received from the optical transmission path 7A with an internal delay of the waiting time amount Wsm inside the optical transmission device 1, so that the total delay can match the set delay Dx.

By performing the queueing process as described above, it is possible to avoid the influence of the difference in propagation delays Dms and Dsm appearing in the output and it is possible to correct the upstream and downstream asymmetry of the optical transmission path 7A. That is, because the queueing is performed in consideration of the asymmetry of the optical transmission path 7A, the accuracy of the time synchronization between the master node 3 and the slave node 4 is improved.

Configuration Example (2) of Communication System

Figure 3:
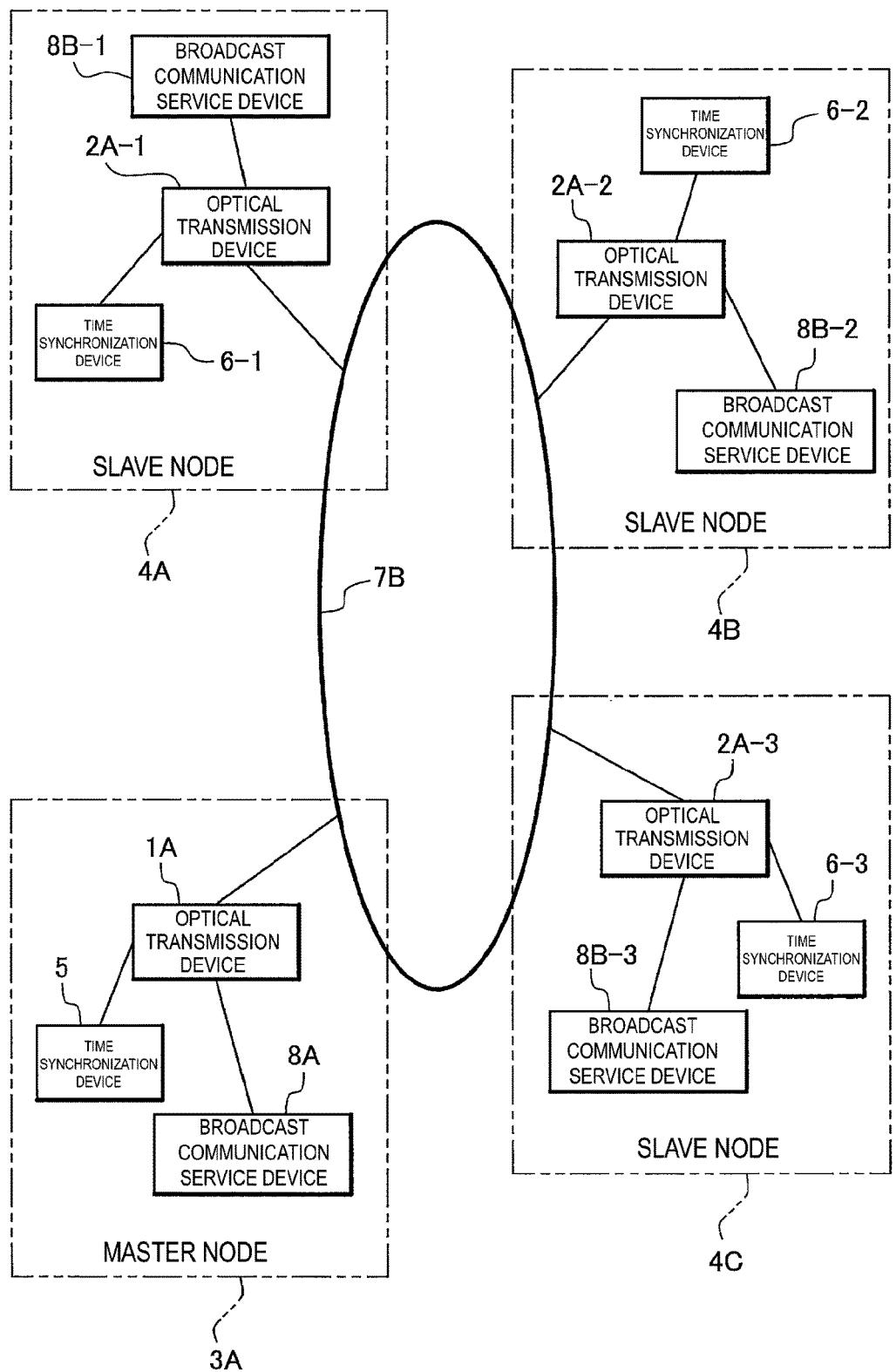
FIG. 3 is a block diagram illustrating a configuration example (2) of a communication system.

A configuration example of a realistic communication system is illustrated in FIG. 3. The communication system illustrated in FIG. 3 is configured to be able to accommodate both a time synchronization signal such as PTP and data of broadcast communication, for example, when a broadcasting type service is performed.

In the communication system of FIG. 3, a master node 3A and a plurality of slave nodes 4A, 4B, and 4C are connected to an optical transmission path 7B formed in a ring shape. The optical transmission path 7B is an optical fiber including one, or two or more core wires. Actually, the optical transmission path 7B forms a ring-shaped path as a whole via the master node 3A and the slave nodes 4A, 4B, and 4C in order.

In the example of FIG. 3, the optical transmission device 1A, the time synchronization device 5, and a broadcast communication service device 8A are connected to the master node 3A. Further, an optical transmission device 2A-1, a time synchronization device 6-1, and a broadcast communication service device 8B-1 are connected to the slave node 4A. Further, an optical transmission device 2A-2, a time synchronization device 6-2, and a broadcast communication service device 8B-2 are connected to the slave node 4B. Further, an optical transmission device 2A-3, a time synchronization device 6-3, and a broadcast communication service device 8B-3 are connected to the slave node 4C. These broadcast communication service devices 8A, 8B-1, 8B-2, and 8B-3 are broadcast communication signal processing units that allow connection with broadcast communication devices that generate broadcast communication information a destination of which is each of a plurality of other nodes.

Figure 22:
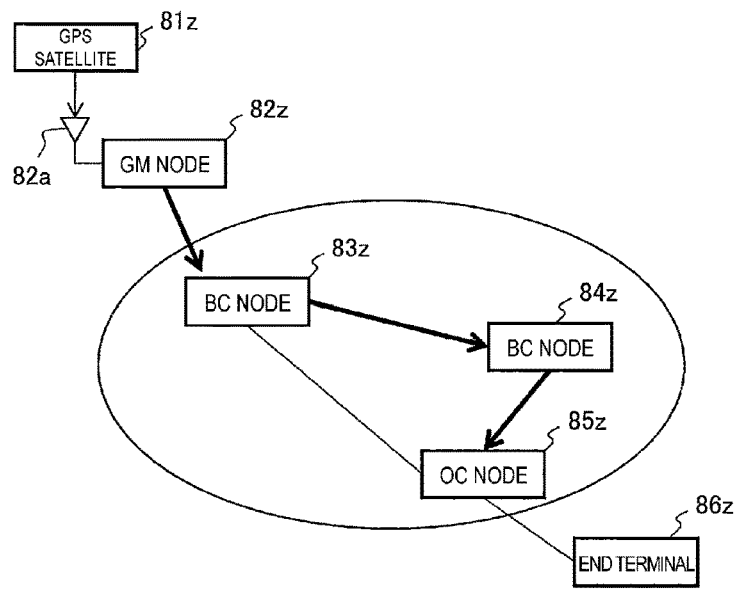
FIG. 22 is a block diagram illustrating a general configuration example of a communication system that performs time synchronization.
Figure 23:
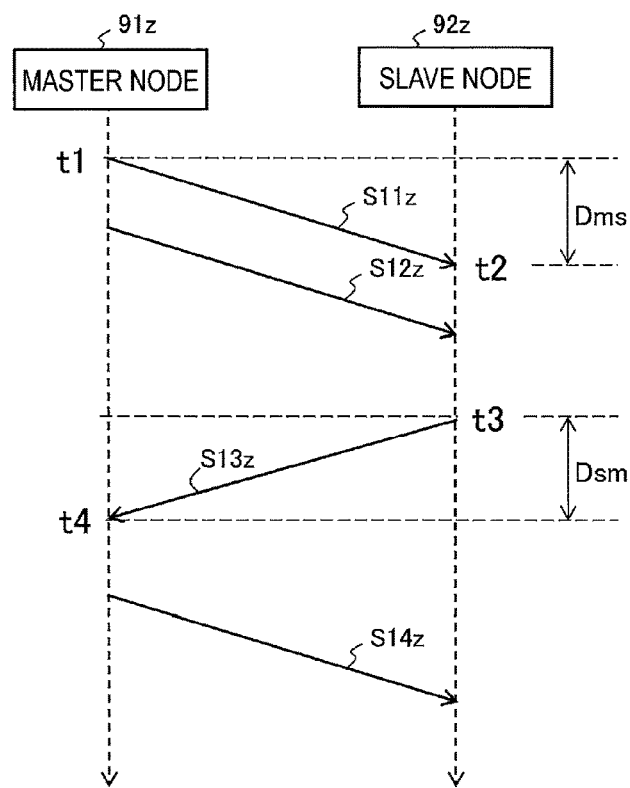
FIG. 23 is a sequence diagram illustrating a general communication procedure when PTP is performed.

The time synchronization devices 5, 6-1, 6-2, and 6-3 illustrated in FIG. 3 correspond to, for example, BC nodes 83z and 84z illustrated in FIG. 22. Thus, time synchronization can be performed between the master node 3A and each of the slave nodes 4A, 4B, and 4C.

The broadcast communication service device 8A connected to the optical transmission device 1A of the master node 3A corresponds to a server that provides information on content such as moving images distributed through a broadcasting type service or the like, or a router required for distribution of the information.

The broadcast communication service device 8B-1 connected to the optical transmission device 2A-1 of the slave node 4A corresponds to a router required for reception of the information on the content such as a moving image distributed through a broadcasting type service or the like via the optical transmission path 7B and the optical transmission device 2A-1 and distribute the information to each terminal. Here, a distribution device for the broadcasting type service is a broadcast communication device that generates broadcast communication information a destination of which is each of a plurality of other nodes. Similarly, the broadcast communication service device 8B-2 corresponds to a router required for reception of the information on the content such as a moving image via the optical transmission path 7B and the optical transmission device 2A-2 and distribution of the information to each terminal. Further, the broadcast communication service device 8B-3 corresponds to a router required for reception of the information on the content such as a moving image via the optical transmission path 7B and the optical transmission device 2A-3 and distribution of the information to each terminal.

Configuration Example of Optical Transmission Device on Master Side

Figure 4:
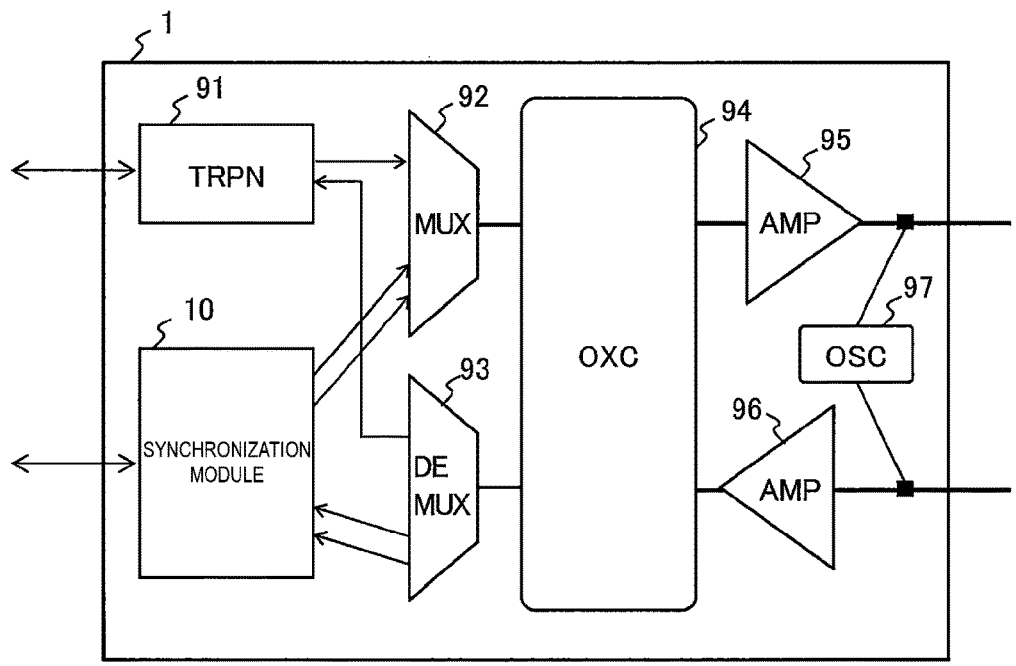
FIG. 4 is a block diagram illustrating a configuration example of an optical transmission device disposed on the master node side.

FIG. 4 illustrates a configuration example of the optical transmission device 1 disposed on the master node side. The optical transmission device 1 illustrated in FIG. 4 has a function corresponding to the communication system illustrated in FIG. 1.

As illustrated in FIG. 4, the optical transmission device 1 includes a synchronization module 10, a transponder (TRPN) 91, a multiplexer (optical multiplexer: MUX) 92, a demultiplexer (optical demultiplexer: DEMUX) 93, an optical cross-connect (OXC) 94, optical amplifiers 95 and 96, and an optical monitoring unit (OSC: Optical Superior Channel) 97.

In the configuration illustrated in FIG. 4, it is assumed that one node on the master side and one node on the slave side communicate with each other, but for example, when communication with three slave nodes is performed, it is necessary for three transponders 91 corresponding to the three slave nodes to be mounted in the optical transmission device 1.

The synchronization module 10 is a module for time synchronization having a particular function for reducing a synchronization error due to the upstream and downstream asymmetry in the optical transmission path 7A or the like, and is configured to function as a master side. That is, the synchronization module 10 measures the propagation delay in the upstream direction from the optical signal in the upstream direction from the optical transmission device 2 of the slave node 4 to the optical transmission device 1 of the master node 3. Further, using a result of the measurement, the synchronization module 10 performs time queueing on the signal received from the optical transmission device 2 for upstream and downstream symmetry. The delay is calculated based on the premise that a wavelength dispersion coefficient of a core wire in the optical transmission path 7A and temperature information are known.

The transponder 91 is a module that converts a client signal to an optical signal having a specific wavelength for wavelength multiplexing, is disposed at each node, and is used as an interface for connecting the optical transmission device 1 to the client.

The multiplexer 92 multiplexes the optical signal from the transponder 91 and the optical signal from the synchronization module 10 and outputs a resultant signal to the optical cross-connect 94. The demultiplexer 93 demultiplexes an optical signal output from the optical cross-connect 94 and outputs a resultant signal to the transponder 91 and the synchronization module 10.

The optical signal output by the optical cross-connect 94 is amplified by the optical amplifier 95 and transmitted to the optical transmission path 7A. The optical signal received from the optical transmission path 7A by the optical transmission device 1 is amplified by the optical amplifier 96 and input to the optical cross-connect 94. The optical monitoring unit 97 monitors the optical signal of the optical transmission path 7A.

Configuration Example (1) of Optical Transmission Device on Slave Side

Figure 5:
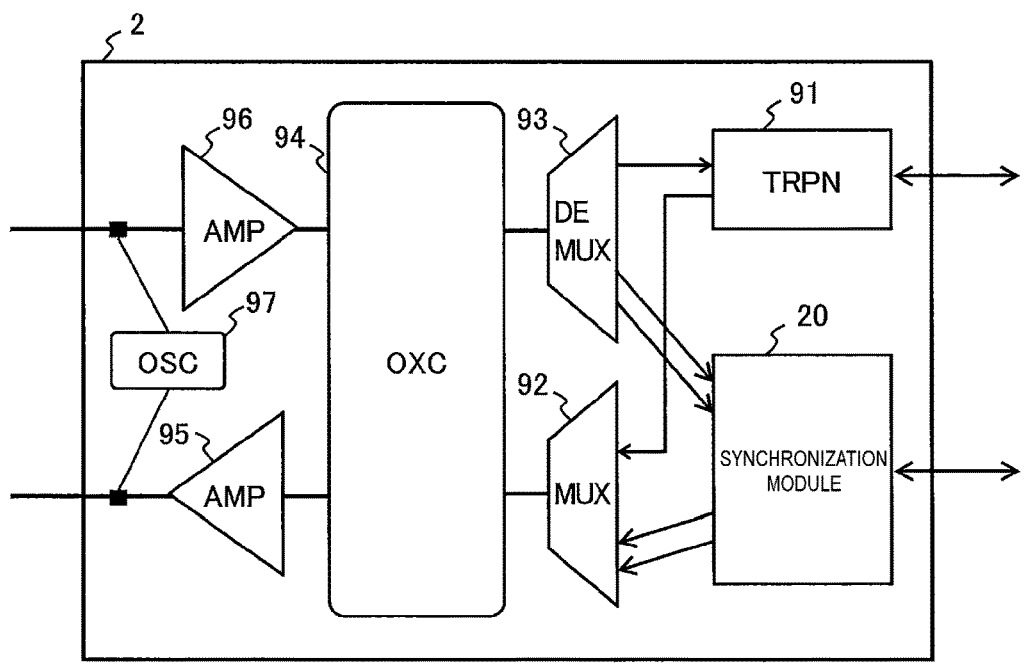
FIG. 5 is a block diagram illustrating a configuration example (1) of an optical transmission device disposed on the slave node side.

FIG. 5 illustrates a configuration example (1) of the optical transmission device 2 disposed on the slave node side. The optical transmission device 2 illustrated in FIG. 5 has a function corresponding to the communication system illustrated in FIG. 1.

As illustrated in FIG. 5, the optical transmission device 2 includes a synchronization module 20, a transponder 91, a multiplexer 92, a demultiplexer 93, an optical cross-connect 94, optical amplifiers 95 and 96, and an optical monitoring unit 97.

The synchronization module 20 in the optical transmission device 2 is a module for time synchronization having a particular function for reducing a synchronization error due to upstream and downstream asymmetry in the optical transmission path 7A or the like, and is configured to function as a slave side. That is, the synchronization module 20 measures the propagation delay in the downstream direction from the optical signal in a downstream direction from the optical transmission device 1 of the master node 3 to the optical transmission device 2 of the slave node 4. Further, using a result thereof, the synchronization module 20 performs time queueing on the signal received from the optical transmission device 1 for upstream and downstream symmetry. The functions of the transponder 91, the multiplexer 92, the demultiplexer 93, the optical cross-connect 94, the optical amplifiers 95 and 96, and the optical monitoring unit 97 in the optical transmission device 2 are the same as those of the optical transmission device 1 described above.

Configuration Example (2) of Optical Transmission Device on Slave Side

Figure 6:
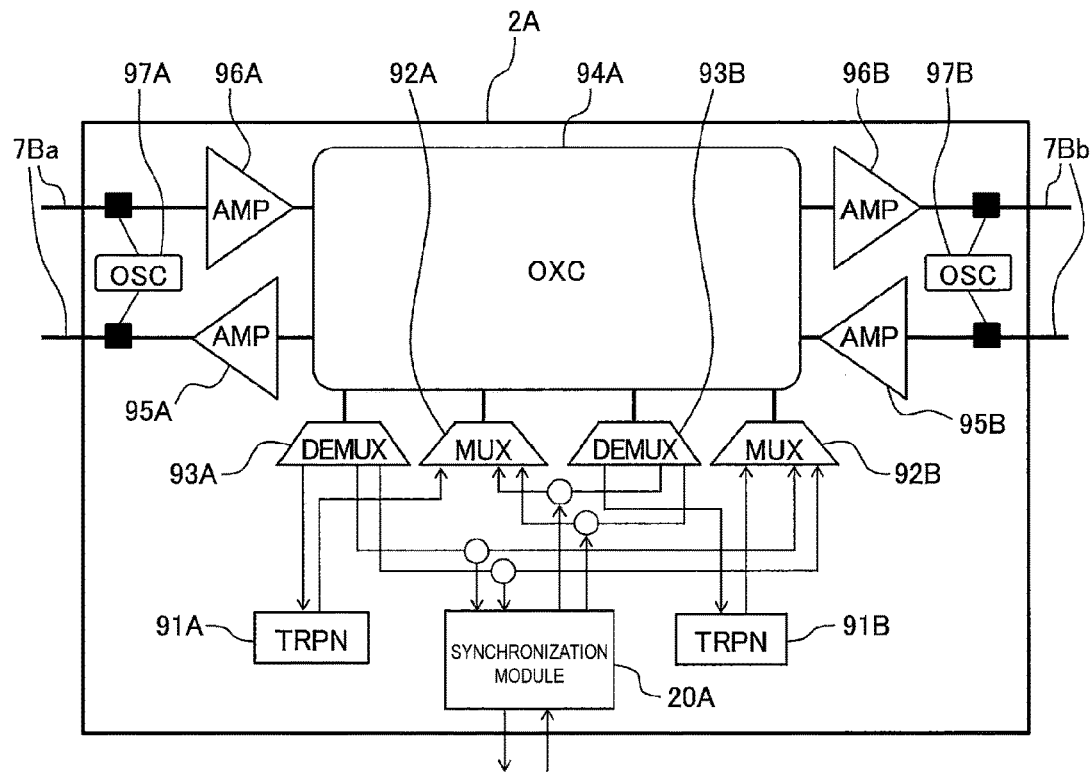
FIG. 6 is a block diagram illustrating a configuration example (2) of an optical transmission device disposed on the slave node side.

FIG. 6 illustrates a configuration example (2) of the optical transmission device 2A disposed on the slave node side. The optical transmission device 2A illustrated in FIG. 6 has a function corresponding to the communication system illustrated in FIG. 3. That is, each of the optical transmission devices 2A-1, 2A-2, and 2A-3 on the slave side illustrated in FIG. 3 is configured like the optical transmission device 2A of FIG. 6.

As illustrated in FIG. 6, the optical transmission device 2A includes a synchronization module 20A, transponders 91A and 91B, multiplexers 92A and 92B, demultiplexers 93A and 93B, an optical cross-connect 94A, optical amplifiers 95A, 95B, 96A, and 96B, optical monitoring units 97A and 97B, and a required number of optical couplers.

The synchronization module 20A is a module for time synchronization having a particular function for reducing a synchronization error due to upstream and downstream asymmetry in the optical transmission path 7A or the like, and is configured to function as a slave side, similar to the synchronization module 20 of FIG. 5. Further, the synchronization module 20A illustrated in FIG. 6 has a function for accommodating multiplexing communication for one-to-many communication and broadcast communication, in addition to the same function as the synchronization module 20.

One end 7Ba and the other end 7Bb of the optical transmission path 7B are connected to one end and the other end of the optical transmission device 2A, respectively, as illustrated in FIG. 6. Thus, an optical signal passing through the optical transmission path 7B is transmitted along a ring-shaped path via the inside of the optical transmission device 2A.

Each transponder 91A and 91B is a module that converts a client signal to an optical signal having a specific wavelength for wavelength multiplexing, is disposed at each node, and is used as an interface for connecting the optical transmission device 2A to the client.

The multiplexer 92A multiplexes the optical signal from the transponder 91A, the optical signal from the synchronization module 20A, and the output of the demultiplexer 93B and outputs a resultant signal to the optical cross-connect 94A. Further, the multiplexer 92B multiplexes the optical signal from the transponder 91B, the optical signal from the synchronization module 20A, and the output of the demultiplexer 93A and outputs a resultant signal to the optical cross-connect 94A.

The demultiplexer 93A demultiplexes the optical signal output from the optical cross-connect 94A and outputs the optical signal to the transponder 91A, the synchronization module 20A, and the multiplexer 92B. Further, the demultiplexer 93B demultiplexes the optical signal output from the optical cross-connect 94A and outputs the optical signal to the transponder 91B, the synchronization module 20A, and the multiplexer 92A.

The optical signal in the upstream direction output by the optical cross-connect 94A is amplified by the optical amplifier 95A and transmitted to one end 7Ba of the optical transmission path 7B in the upstream direction. The optical signal in a downstream direction output by the optical cross-connect 94A is amplified by the optical amplifier 96BA and transmitted to the other end 7Bb of the optical transmission path 7B in the downstream direction.

Further, the optical signal in the downstream direction received at the one end 7Ba of the optical transmission path 7B by the optical transmission device 2A is amplified by the optical amplifier 96A and input to the optical cross-connect 94A. The optical signal in an upstream direction received at the other end 7Bb of the optical transmission path 7B by the optical transmission device 2A is amplified by the optical amplifier 95B and input to the optical cross-connect 94A.

The optical monitoring unit 97A monitors the optical signal at the one end 7Ba of the optical transmission path 7B. The optical monitoring unit 97B monitors the optical signal at the other end 7Bb of the optical transmission path 7B.

A configuration of the optical transmission device 1A on the master side illustrated in FIG. 3 is the same as that of the optical transmission device 2A in FIG. 6 except that a synchronization module 10A corresponding to a function of the master is mounted instead of the synchronization module 20A.

Example of Connection of Plurality of Synchronization Modules

Figure 7:
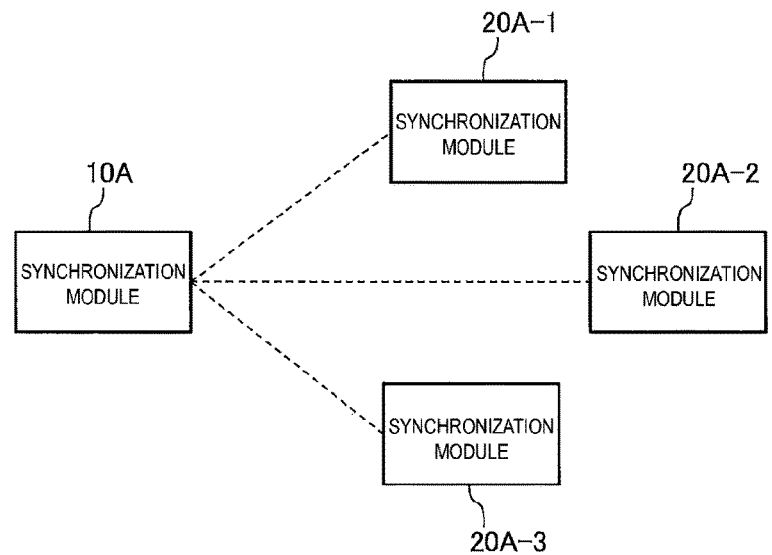
FIG. 7 is a block diagram illustrating a connection example of a plurality of synchronization modules.

FIG. 7 illustrates an example of a connection of a plurality of synchronization modules. That is, in the communication system having the configuration illustrated in FIG. 3, the synchronization module 10A on the master side and the plurality of synchronization modules 20A-1, 20A-2, and 20A-3 on the slave side are connected communicatively as illustrated in FIG. 7. The synchronization modules 10A, 20A-1, 20A-2, and 20A-3 illustrated in FIG. 7 are included in the optical transmission devices 1A, 2A-1, 2A-2, and 2A-3 illustrated in FIG. 3, respectively.

Thus, the synchronization module 10A on the master side and the synchronization module 20A-1 on the slave side can communicate with each other. Further, the synchronization module 10A on the master side and the synchronization module 20A-2 on the slave side can communicate with each other. The synchronization module 10A on the master side and the synchronization module 20A-3 on the slave side can communicate with each other.

Details of Configuration of Synchronization Module on Master Side

Figure 8:
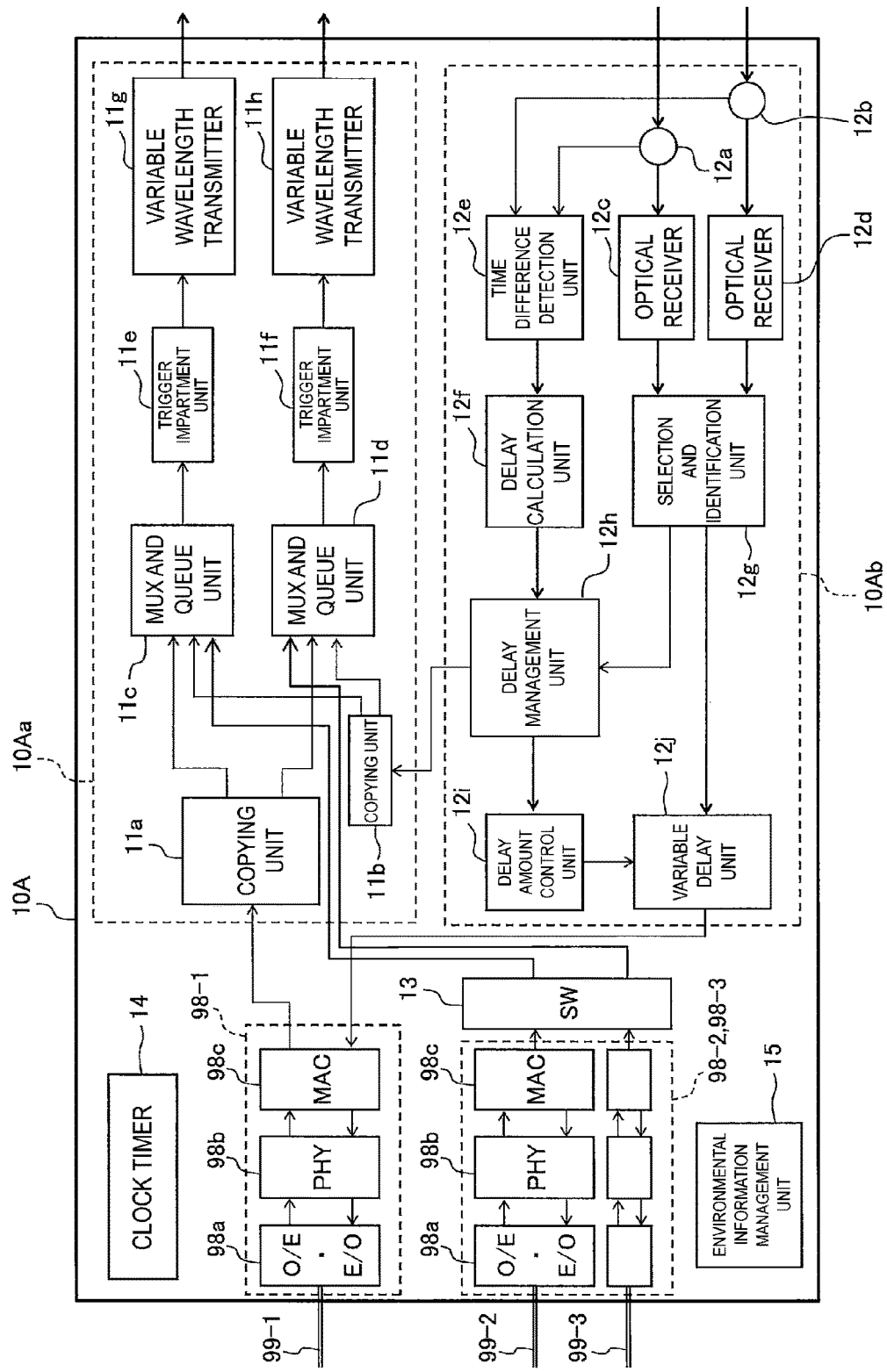
FIG. 8 is a block diagram illustrating a configuration example of a synchronization module disposed on the master node side.

FIG. 8 illustrates a configuration example of the synchronization module 10A disposed on the master node side.

The synchronization module 10A illustrated in FIG. 8 includes a transmission processing unit 10Aa, a reception processing unit 10Ab, a plurality of common units 98-1, 98-2, and 98-3, a switch unit (SW) 13, a clock timer 14, and an environmental information management unit 15.

Further, the transmission processing unit 10Aa includes copying units 11a and 11b of two systems, MUX and queue units 11c and 11d of the two systems, trigger impartment units 11e and 11f of the two systems, and variable wavelength transmitters 11g and 11h of the two systems.

The reception processing unit 10Ab includes optical couplers 12a and 12b, optical receivers 12c and 12d, a time difference detection unit 12e, a delay calculation unit 12f, a selection and identification unit 12g, a delay management unit 12h, a delay amount control unit 12i, and a variable delay unit 12j.

Each of the common units 98-1, 98-2, and 98-3 includes an O/E·E/O unit 98a, a PHY unit 98b, and a MAC unit 98c. The O/E·E/O unit 98a performs mutual conversion between an optical signal (O) and an electrical signal (E). The PHY unit 98b performs signal processing of a physical layer (PHY) in data transmission. The MAC unit 98c implements media access control (MAC).

An optical transmission path 99-1 connected to one end of the common unit 98-1 is connected to a time synchronization terminal on the master side, that is, the time synchronization device 5 in FIG. 3. Further, optical transmission paths 99-2 and 99-3 connected to one end of the common units 98-2 and 98-3 are connected to a broadcast communication device on the master side, that is, the broadcast communication service device 8A in FIG. 3. The number of installed common units 98-2 and 98-3 can be increased as necessary according to the number of broadcast communication service devices 8A connected to the master side.

The switch unit 13 selectively outputs packets appearing in outputs of the plurality of common units 98-2 and 98-3. The switch unit 13 normally outputs a packet to only one of the outputs of the two systems. However, in some cases, the same packet may be output to both of the outputs of the two systems. For example, it is assumed that optical signals having two wavelengths are simultaneously used and packets are transmitted for redundant and highly reliable communication. In this case, the switch unit 13 copies the input packets to create the same two packets, and simultaneously outputs the packets to the outputs of the two systems. The outputs of the two systems of the switch unit 13 are connected to respective inputs of the MUX and queue units 11c and 11d of the two systems.

The clock timer 14 manages a frequency and a timing and supplies a required timing signal to each unit in order to ensure a synchronization operation between respective functional units in the synchronization module 10A. The environmental information management unit 15 holds and manages information on a wavelength dispersion coefficient and information on a temperature in the optical transmission paths 7A and 7B.

The copying unit 11a in the transmission processing unit 10Aa has a function of copying a PTP packet input from an output of the common unit 98-1 and simultaneously outputting the same PTP packet to outputs of the two systems. The outputs of the two systems of the copying unit 11a are connected to respective inputs of the MUX and queue units 11c and 11d.

The copying unit 11b has a function of copying a unique packet output by the delay management unit 12h and simultaneously outputting the same unique packet to the outputs of the two systems. The outputs of the two systems of the copying unit 11b are connected to the inputs of the MUX and queue unit 11c and 11d.

Each of the MUX and queue units 11c and 11d includes a multiplexer that selects one of a plurality of inputs and a buffer memory. The selection of this multiplexer enables the PTP packet output by the copying unit 11a, the unique packet output by the copying unit 11b, and the broadcast communication packet output by the switch unit 13 to be superimposed on optical signals having the same wavelength and transmitted. The buffer memories in the MUX and queue units 11c and 11d are used for buffering for adjusting a transmission waiting time of each packet.

Further, in the present embodiment, the MUX and queue units 11c and 11d have a function of adjusting a transmission timing in consideration of a priority of each packet. Specifically, when the PTP packet is transmitted in consideration of a need to improve the accuracy of the time synchronization, the PTP packet is given a higher priority than other types of packets so that the transmission waiting time is minimized, and controls such as sorting of packets is performed so that the PTP packet is transmitted with the highest priority. The trigger impartment units 11e and 11f impart a trigger for detection to the unique packet that is used for detection of a delay difference between a plurality of wavelengths.

The variable wavelength transmitter 11g converts each packet input from the trigger impartment unit 11e to an optical signal and outputs the optical signal. The variable wavelength transmitter 11h converts each packet input from the trigger impartment unit 11f to an optical signal and outputs the optical signal. The two variable wavelength transmitters 11g and 11h are used such that optical signals can be transmitted using two or more different wavelengths at the same time.

Further, in the present embodiment, the variable wavelength transmitters 11g and 11h intermittently generate the optical signals using a burst signal so that a plurality of types of packets at respective wavelengths can be selectively transmitted at different times. Thus, devices that support a burst operation are adopted as variable wavelength transmitters 11g and 11h. That is, in a no-signal state in which no data flows, optical outputs of the respective variable wavelength transmitters 11g and 11h are substantially zero.

Thus, optical burst signals are sent from a plurality of nodes in shifted non-signal time periods at synchronized timings, so that collision of a plurality of packets can be avoided in an optical region and one wavelength can be shared by the plurality of nodes.

When regulations of a passive optical network (PON) suitable for broadcast communication is utilized, an upstream signal is a burst signal, but a downstream signal is a continuous signal. Thus, in that case, the variable wavelength transmitters 11g and 11h that transmit the downstream signal on the master side may not be the devices that support a burst operation.

The optical signals having the respective wavelengths received by the synchronization module 10A are input to the optical couplers 12a and 12b, respectively. The optical couplers 12a and 12b copy the input optical signals and output the optical signals in two directions. The optical signal output by the optical coupler 12a is input to the optical receiver 12c and the time difference detection unit 12e. The optical signal output by the optical coupler 12b is input to the optical receiver 12d and the time difference detection unit 12e.

The optical receivers 12c and 12d convert the respective input optical signals to electrical signals. Further, because it is assumed that the burst signal is handled in the present embodiment, the devices that support a burst operation are adopted for the optical receivers 12c and 12d.

The time difference detection unit 12e detects an arrival time difference Δt21 at peak positions in the two input systems, that is, optical signal waveforms of the two wavelengths. The delay calculation unit 12f uses the arrival time difference Δt21 detected by the time difference detection unit 12e to calculate a distance (optical path length) Lsm in the upstream direction from the slave to the master. Further, the propagation delay Dsm in the upstream direction is calculated. Details of this calculation will be described below.

The selection and identification unit 12g selects and outputs only one of the two same received signals generated by copying. Further, the selection and identification unit 12g identifies a type of the received signal and separates the signal into the PTP packet and the unique packet.

The delay management unit 12h in the synchronization module 10A of the master individually manages the propagation delay Dsm in the upstream direction calculated by the delay calculation unit 12f in the own module and the propagation delay Dms in the downstream direction notified from each synchronization module 20A on the slave side, for the synchronization modules 20A on all the connected slave side.

Further, the delay management unit 12h determines an appropriate value of the set delay Dx based on the propagation delays Dsm and Dms. Further, a unique packet for notifying each corresponding synchronization module 20A on the slave side of information on the determined set delay Dx is generated. Further, the delay management unit 12h determines the delay amount in the own module, that is, the waiting time amount Wsm on the reception side illustrated in FIG. 2 based on the determined set delay Dx and the propagation delay Dsm for each module.

$$Wsm = Dx - Dsm \qquad (6)$$

Further, in the communication system of the present embodiment, because both functions of communication for time synchronization and communication for broadcast communication having different types or properties are included, the synchronization module 10A individually adjusts a queueing amount for the time synchronization signal and a queueing amount for the broadcast communication signal to appropriate values. Thus, the delay management unit 12h provided in the synchronization module 10A of the master individually determines the set delay Dx that is applied to the time synchronization signal and the set delay Dx2 that is applied to the broadcast communication signal. The synchronization module 20A of the slave determines a delay time in the variable delay unit 12j for each type of received signal based on information on the waiting time amount notified from the synchronization module 10A of the master.

The set delay Dx2 for the broadcast communication signal is determined as follows. First, the propagation delay Dms is detected in all the slave nodes that perform the broadcast communication. A maximum value max (Dms) is then selected from among the detected propagation delays Dms of all the slave nodes. A result of adding an appropriate margin to the maximum value max (Dms) is defined as the set delay Dx2. That is, the set delay Dx2 is larger than the maximum value max (Dms).

The delay amount control unit 12i controls a setting of the variable delay unit 12j so that the delay time in the variable delay unit 12j matches the waiting time amount Wsm on the reception side determined by the delay management unit 12h.

Thus, an optical signal transmitted from a transmission source on the slave side is delayed by the propagation delay Dsm, arrives at the synchronization module 10A, and then is further delayed by the waiting time amount Wsm in the variable delay unit 12j. Thus, in an output of the variable delay unit 12j, the received signal can be processed in a state in which the signal is delayed by a time of a set delay Dx that is common upstream and downstream regardless of the upstream and downstream asymmetry of the optical transmission paths 7A and 7B. That is, it is possible to perform time synchronization between nodes with high accuracy. Further, by setting this set delay Dx to a value larger than the assumed maximum delay Dmax, it is possible to maintain the accuracy of the time synchronization even when the optical path length fluctuates due to a temperature change.

Figure 9:
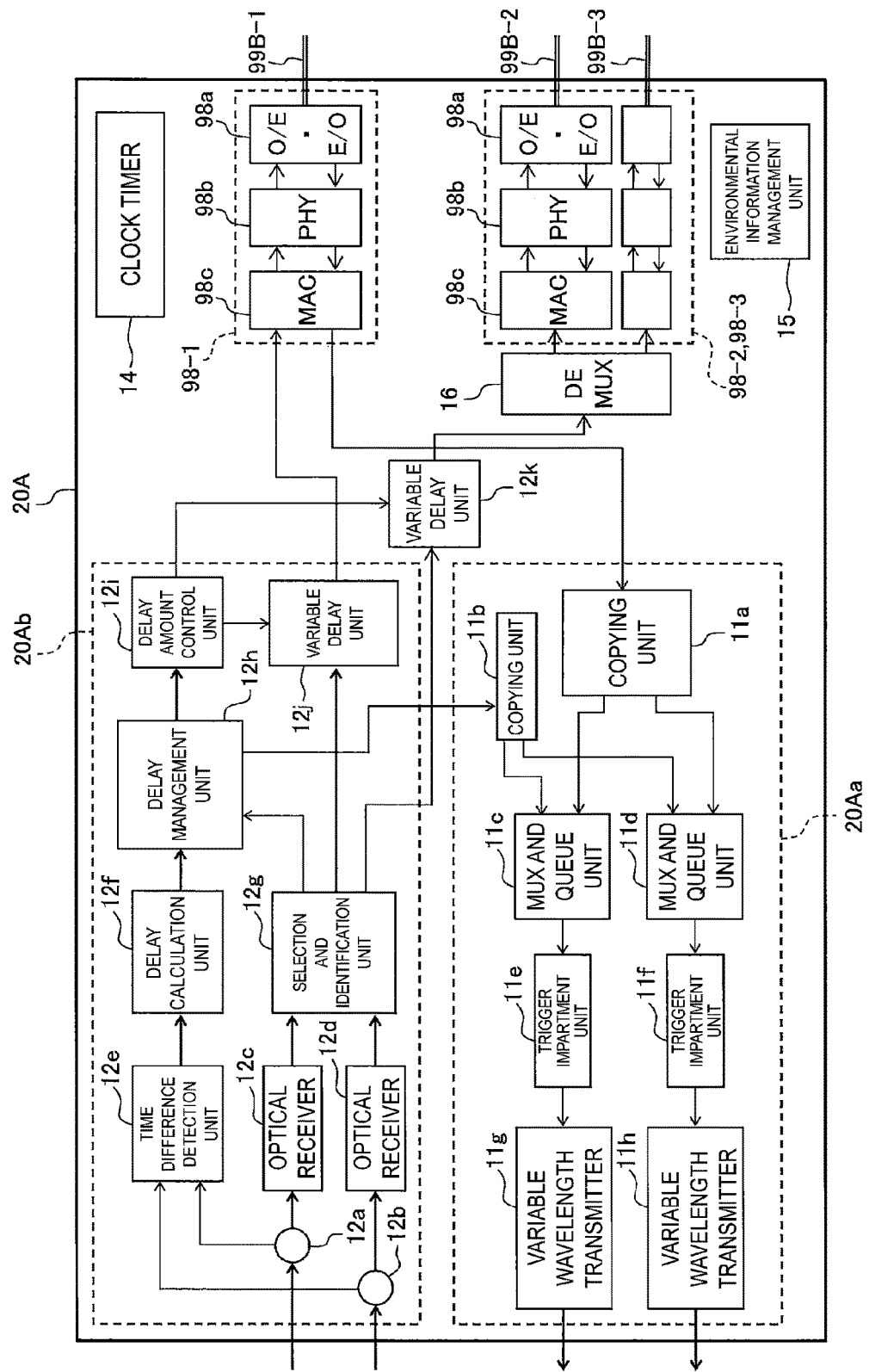
FIG. 9 is a block diagram illustrating a configuration example of a synchronization module disposed on the slave node side.

Details of Configuration of Synchronization Module on Slave Side FIG. 9 illustrates a configuration example of the synchronization module 20A disposed on the slave node side.

The synchronization module 20A illustrated in FIG. 9 includes a transmission processing unit 20Aa, a reception processing unit 20Ab, a plurality of common units 98-1, 98-2, and 98-3, a demultiplexer (DEMUX) 16, a variable delay unit 12k, a clock timer 14, and an environmental information management unit 15.

Further, the transmission processing unit 20Aa includes copying units 11a and 11b of two systems, MUX and queue units 11c and 11d of two systems, trigger impartment units 11e and 11f of two systems, and variable wavelength transmitters 11g and 11h of two systems.

The reception processing unit 20Ab includes optical couplers 12a and 12b, optical receivers 12c and 12d, a time difference detection unit 12e, a delay calculation unit 12f, a selection and identification unit 12g, a delay management unit 12h, a delay amount control unit 12i, and variable delay unit 12j.

An optical transmission path 99B-1 connected to one end of the common unit 98-1 is connected to a terminal for time synchronization on the slave side, that is, the time synchronization devices 6-1 to 6-3 in FIG. 3. Further, optical transmission paths 99B-2 and 99B-3 connected to one end of the common unit 98-2 and one end of the common unit 98-3 are connected to broadcast communication devices on the slave side, that is, broadcast communication service devices 8B-1 to 8B-3 in FIG. 3. The number of installed common units 98-2 and 98-3 can be increased as necessary according to the number of broadcast communication service devices 8B-1 to 8B-3 connected to the slave side.

That is, most functions of the synchronization module 20A illustrated in FIG. 9 are the same as those of the synchronization module 10A on the master side described above except for different functions required on the slave side. Different parts will be described hereinafter. When communication is performed by utilizing the regulations of the PON, an upstream signal is a burst signal, but a downstream signal is a continuous signal. Thus, in that case, the optical receivers 12c and 12d that receive the downstream signal on the slave side may not be the devices that support a burst operation.

The time difference detection unit 12e in the synchronization module 20A detects an arrival time difference Δt12 at the peak positions in the two systems input in the downstream direction, that is, the optical signal waveforms of the two wavelengths.

Further, the delay calculation unit 12f calculates a distance (optical path length) Lms in a downstream direction from the master to the slave by using the arrival time difference Δt12 detected by the time difference detection unit 12e. Further, the propagation delay Dms in the downstream direction is calculated. Details of this calculation will be described below.

The delay management unit 12h in the synchronization module 20A of the slave manages the propagation delay Dms in the downstream direction calculated by the delay calculation unit 12f in the own module and the propagation delay Dsm in the upstream direction notified from each synchronization module 20A on the slave side.

Further, the delay management unit 12h generates a unique packet for notifying the synchronization module 10A on the master side of the calculated propagation delay Dms. Further, the delay management unit 12h determines a delay amount in the own module, that is, the waiting time amount Wms on the reception side illustrated in FIG. 2 based on the set delay Dx notified from the master side and the propagation delay Dms in the downstream direction.

$$Wms=Dx-Dms \quad (7)$$

The delay amount control unit 12i controls a setting of the variable delay unit 12j so that the delay time in the variable delay unit 12j matches the waiting time amount Wms on the reception side determined by the delay management unit 12h.

Thus, an optical signal transmitted from a transmission source on the master side is delayed by the propagation delay Dms, arrives at the synchronization module 20A, and then, is further delayed by the waiting time amount Wms in the variable delay unit 12j. Thus, in an output of the variable delay unit 12j, the received signal can be processed in a state in which the signal is delayed by a set delay Dx that is common upstream and downstream regardless of the upstream and downstream asymmetry of the optical transmission paths 7A and 7B. That is, it is possible to perform time synchronization between nodes with high accuracy. Further, by setting this set delay Dx to a value larger than the assumed maximum delay Dmax, it is possible to maintain the accuracy of the time synchronization even when the optical path length fluctuates due to a temperature change.

Further, the optical signal of the broadcast communication signal transmitted from the master side to each slave is sent to the respective broadcast communication service devices 8B-1 to 8B-3 via the optical couplers 12a and 12b, the optical receivers 12c and 12d, the selection and identification unit 12g, the variable delay unit 12k, the demultiplexer 16, and the common unit 98-2 or 98-3. That is, the selection and identification unit 12g selects the variable delay unit 12k as an output destination of the broadcast communication signal. Further, the demultiplexer 16 selects an output path according to a distribution destination of the broadcast communication signal.

A delay amount with respect to the broadcast communication signal is set by the delay amount control unit 12i controlling the variable delay unit 12k. Here, because the two independent variable delay units 12j and 12k are included in the synchronization module 20A, a delay amount with respect to the time synchronization signal and the delay amount with respect to the broadcast communication signal can be determined to be independent lengths. Further, because the delay amount with respect to the broadcast communication signal can be managed individually for each slave node, the delay management units 12h and 12i can determine a delay time of the variable delay unit 12k in consideration of a delay time difference in the propagation path of each node. This makes it possible to make synchronization so that the common broadcast communication signal is distributed to the broadcast communication service devices 8B-1 to 8B-3 connected to all slave nodes at the same time.

Specific Calculation Example of Propagation Delays Dms and Dsm

Figure 10:
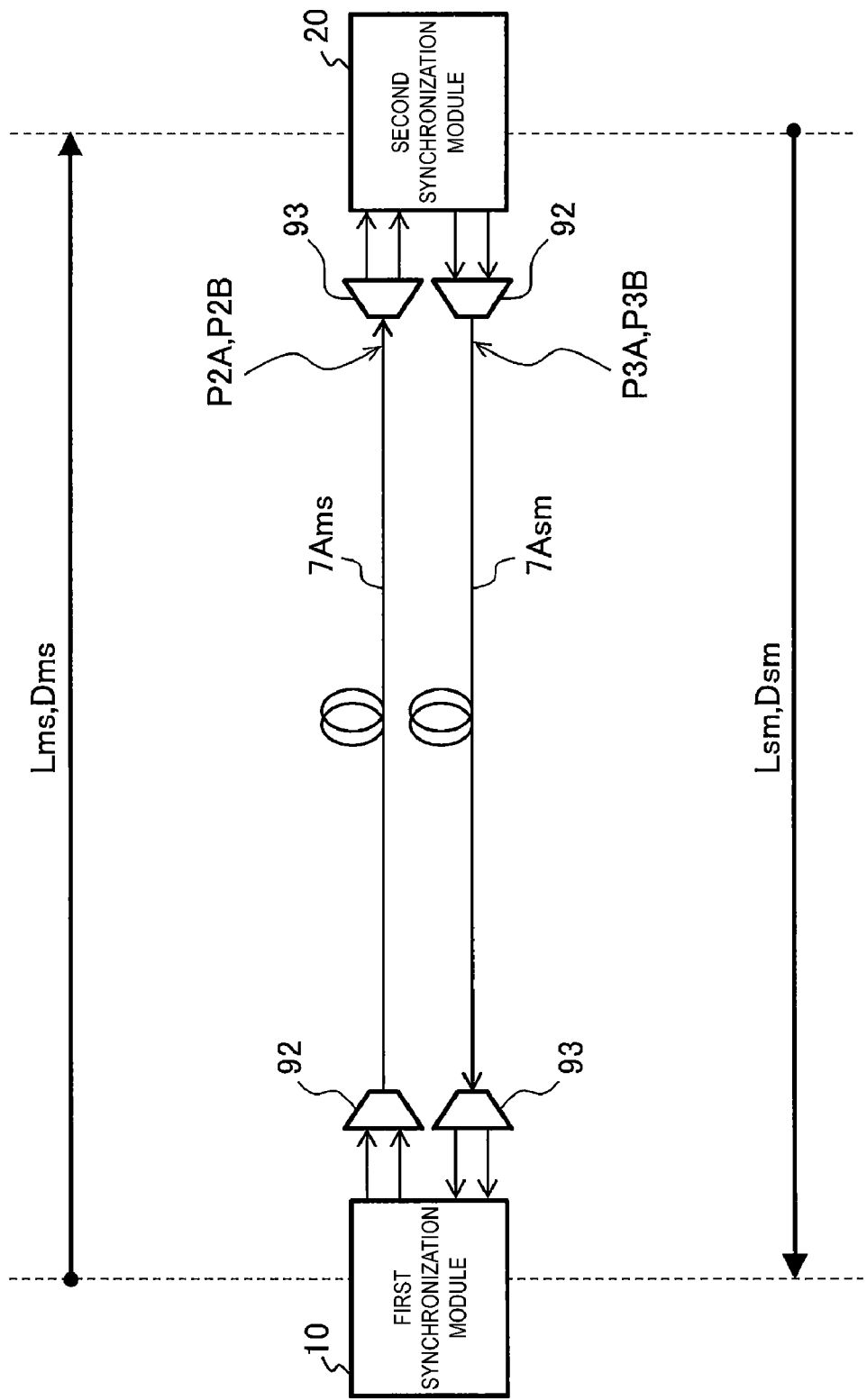
FIG. 10 is a schematic diagram illustrating an example of a relationship between a transmission path connecting two synchronization modules and a propagation delay.
Figure 11A:
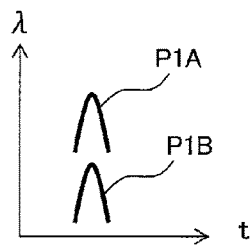
FIG. 11A is a waveform diagram illustrating an example of a two-wavelength optical signal transmitted to a transmission path by a master side.
Figure 11B:
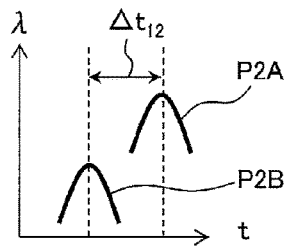
FIG. 11B is a waveform diagram illustrating an example of a two-wavelength optical signal arriving on a slave side from the transmission path.
Figure 11C:
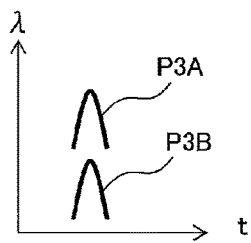
FIG. 11C is a waveform diagram illustrating an example of a two-wavelength optical signal transmitted to the transmission path by the slave side.
Figure 11D:
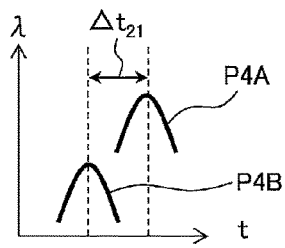
FIG. 11D is a waveform diagram illustrating an example of a two-wavelength optical signal arriving at the master side from a transmission path.

FIG. 10 illustrates an example of a relationship between the transmission path connecting the two synchronization modules 10 and 20 and the propagation delay. Further, an example of a two-wavelength optical signal that is transmitted to the transmission path by the master side is illustrated in FIG. 11A. An example of a two-wavelength optical signal arriving at the slave side from the transmission path is illustrated in FIG. 11B. An example of a two-wavelength optical signal that is transmitted to the transmission path by the slave side is illustrated in FIG. 11C. An example of a two-wavelength optical signal arriving at the master side from the transmission path is illustrated in FIG. 11D.

In FIGS. 11A to 11D, a horizontal axis indicates a time t, and a vertical axis diretion indicates a difference in amplitude or a difference in wavelength λ. That is, two transmission-end optical signals P1A and P1B having different wavelengths λ are simultaneously transmitted to a downstream transmission path 7Ams. Further, the time difference Δt12 is generated between two reception-end optical signals P2A and P2B arriving at the synchronization module 20 due to an influence of wavelength dispersion of the downstream transmission path 7Ams.

Further, two transmission-end optical signals P3A and P3B having different wavelengths λ are simultaneously transmitted to an upstream transmission path 7Asm. Further, the time difference Δt21 is generated between two reception-end optical signals P4A and P4B arriving at the synchronization module 10 due to an influence of wavelength dispersion of the upstream transmission path 7Asm.

The following matters (a1) to (a3) are assumed as the premise in a case in which the propagation delays Dms and Dsm are calculated.

(a1) An optical fiber pair between the time synchronization devices 5 and 6 and the synchronization modules 10 and 20 and an optical fiber group between the synchronization modules 10 and 20 and the multiplexer 92/the demultiplexer 93 have the same length.

(a2) A wavelength dispersion coefficient C [ps/nm/km] of the optical fiber is known, and distances (optical path lengths) Lms and Lsm between the respective synchronization modules 10 and 20 are unknown.

(a3) A temperature is known.

An overview of the propagation delay measurement procedure is as in (1) to (b10) below.

(b1) The synchronization module 10 on the master side simultaneously uses two different wavelengths to simultaneously transmit unique packets for delay measurement to the downstream transmission path 7Ams as the transmission-end optical signals P1A and P1B, as illustrated in FIG. 11A.

(b2) In this case, the reception-end optical signals P2A and P2B having two wavelengths arriving at the synchronization module 20 are deviated by the time difference Δt12 [ps] as illustrated in FIG. 11B. This deviation is due to wavelength dispersion.

$$t12 = C \times \Delta\lambda \times Lms \quad (8)$$

C: Wavelength dispersion coefficient
Δλ: Wavelength difference between two wavelengths (b3) The synchronization module 20 measures the time difference Δt12 as the arrival time difference between the reception-end optical signals P2A and P2B having two wavelengths.

(b4) The synchronization module 20 calculates a downward distance Lms using a relationship of Equation (8) above.

(b5) For example, the synchronization module 20 calculates the propagation delay Dms based on Equation (9) below.

$$Dms = 5000[\text{ns/km}] \times Lms[\text{km}] \times K1 \quad (9)$$

K1: Temperature correction coefficient (b6) The synchronization module 20 on the slave side simultaneously uses two different wavelengths to simultaneously transmit unique packets for delay measurement to the upstream transmission path 7Asm as the transmission-end optical signals P3A and P3B, as illustrated in FIG. 11C.

(b7) In this case, the reception-end optical signals P4A and P4B having two wavelengths arriving at the synchronization module 10 are deviated by the time difference Δt21 [ps] as illustrated in FIG. 11D. This deviation is due to wavelength dispersion.

$$t21 = C \times \Delta\lambda \times Lsm \quad (10)$$

(b8) The synchronization module 10 measures the time difference Δt21 as the arrival time difference between the reception-end optical signals P4A and P4B having two wavelengths.

(b9) The synchronization module 10 calculates the distance Lsm in the upstream direction using a relationship of Equation (10) above.

(b10) The synchronization module 20 calculates the propagation delay Dsm based on Equation (11) below.

$$Dsm = 5000[\text{ns/km}] \times Lsm[\text{km}] \times K1 \quad (11)$$

Figure 12:
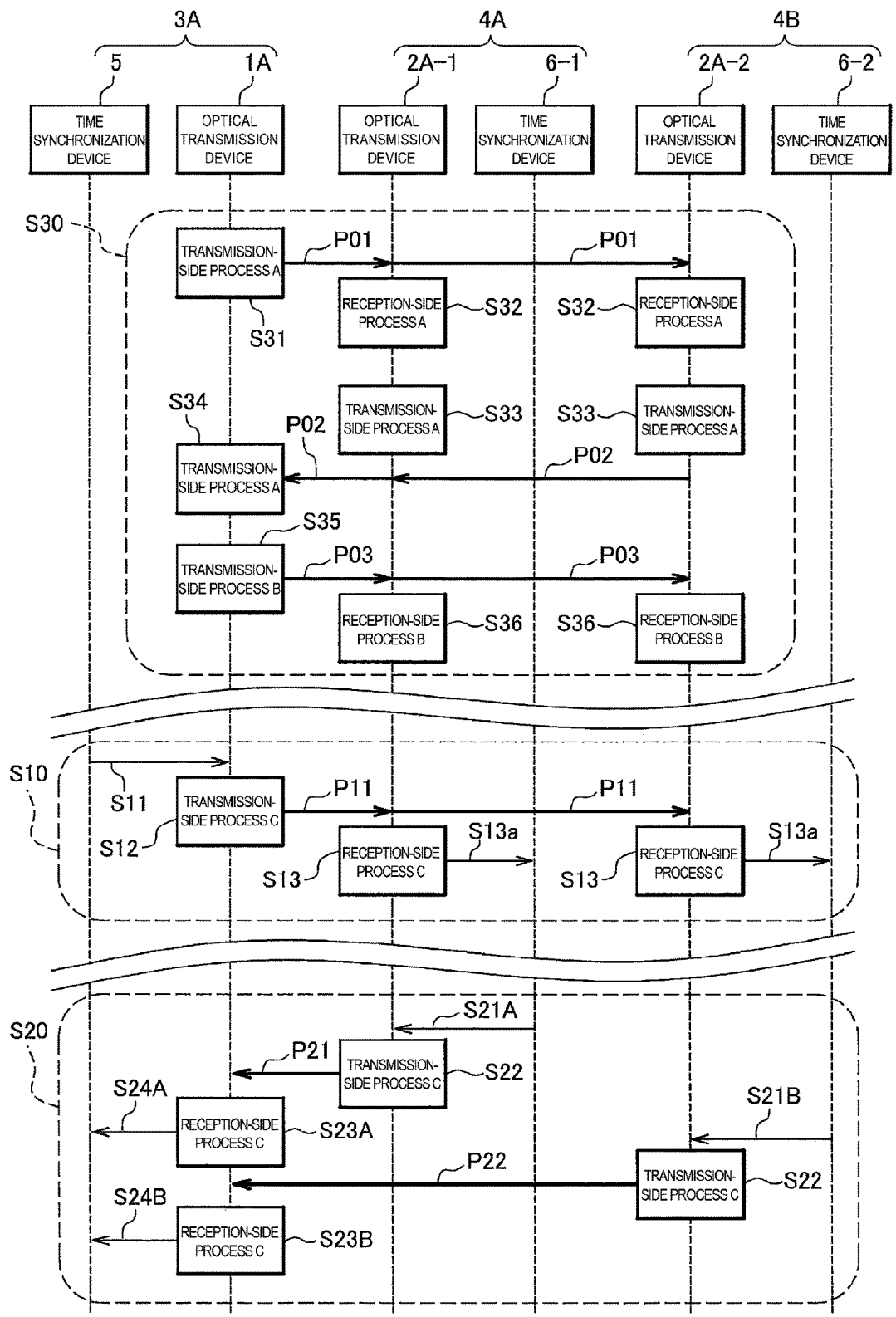
FIG. 12 is a sequence diagram illustrating an overview of an operation procedure when time synchronization is performed in the communication system illustrated in FIG. 3.

Processing Procedure of Communication System
Processing Procedure for Time Synchronization FIG. 12 illustrates an overview of an operation procedure when time synchronization is performed in the communication system illustrated in FIG. 3. Actually, the synchronization module 10A in the optical transmission device 1A of the master node 3A performs processes of steps S31, S34, S35, S12, S23A, and S23B in FIG. 12. Further, the synchronization module 20A in the optical transmission device 2A-1 of the slave node 4A performs processes of steps S32, S33, S36, S13, and S22 in FIG. 12. The same applies to the optical transmission device 2A-2 of the slave node 4B.

The processing procedure illustrated in FIG. 12 will be described hereinafter. The processing procedure illustrated in FIG. 12 is roughly divided into a preparation phase S30 and PTP packet processing phases S10 and S20. Specifically, the preparation phase S30 is a process of collecting information on the propagation delays Dms and Dsm. The PTP packet processing phase S10 corresponds to each process of "Sync", "Follow-up", and "Delay-res" in PTP, and the PTP packet processing phase S20 corresponds to a process of "Delay-Req" in PTP. Here, it is distinctively characterized in that the particular preparation phase S30 required for correcting the upstream and downstream asymmetry is executed before the PTP packet processing phases S10 and S20.

Further, "transmission-side process A" and "reception-side process A" illustrated in FIG. 12 are processes of calculating the propagation delay in one direction. Further, "transmission-side process B" and "reception-side process B" are processes of calculating a reference value of a propagation delay of the PTP packet and notifying of the reference value. Further, "transmission-side process C" and "reception-side process C" are processes of performing a queueing process on the PTP packets to symmetrize an upstream and downstream propagation delay.

The optical transmission device 1A transmits a two-wavelength optical signal P01 in the "transmission-side process A" of step S31. This two-wavelength optical signal P01 are simultaneously sent to the optical transmission device 2A-1 of the slave node 4A and the optical transmission device 2A-2 of the slave node 4B using a downlink of the optical transmission path 7B including a plurality of wavelengths.

Each of the optical transmission devices 2A-1 and 2A-2 on the slave side receives and processes the two-wavelength optical signal P01 sent from the master side in the "reception-side process A" of step S32.

Each of the optical transmission devices 2A-1 and 2A-2 on the slave side transmits a two-wavelength optical signal P02 in the "transmission-side process A" of the next step S33 based on a processing result of step S32. The two-wavelength optical signal P02 are simultaneously sent to the optical transmission device 1A of the master node 3A using an uplink of the optical transmission path 7B including a plurality of wavelengths.

Further, the two-wavelength optical signal P02 transmitted by the optical transmission device 2A-1 and the two-wavelength optical signal P02 transmitted by the optical transmission device 2A-2 are transmitted as burst signals at shifted timings not to collide with each other. Further, the two-wavelength optical signal P02 transmitted by the optical transmission device 2A-1 includes the propagation delay Dms detected by the optical transmission device 2A-1, and the two-wavelength optical signal P02 transmitted by the optical transmission device 2A-2 includes the propagation delay Dms detected by the optical transmission device 2A-2.

The optical transmission device 1A on the master side receives and processes the two-wavelength optical signals P02 transmitted by the optical transmission devices 2A-1 and 2A-2 on the slave side in the "reception-side process A" in step S34.

The optical transmission device 1A on the master side transmits the two-wavelength optical signal P03 in the "transmission-side process B" of step S35. This two-wavelength optical signal P03 is used to notify the slave side of the information on the set delay Dx determined by the optical transmission device 1A on the master side.

Each of the optical transmission devices 2A-1 and 2A-2 on the slave side receives and processes the two-wavelength optical signal P03 sent from the master side in the "reception-side process B" of step S36. Each of the optical transmission devices 2A-1 and 2A-2 can determine the waiting time amount Wms in the downstream direction illustrated in FIG. 2 based on the information on the set delay Dx acquired in step S36 and the propagation delay Dms.

Subsequently, a process of the PTP packet processing phase S10 illustrated in FIG. 12 is executed as follows.

The time synchronization device 5 connected to the master node 3 transmits the PTP packet to the optical transmission device 1A in step S11.

Based on the PTP packet received from the time synchronization device 5, the optical transmission device 1A transmits the two-wavelength optical signal P11 to the optical transmission devices 2A-1 and 2A-2 on the slave side in the "transmission-side process C" of step S12. The two-wavelength optical signal P11 includes the PTP packet received by the optical transmission device 1A.

When each of the optical transmission devices 2A-1 and 2A-2 on the slave side receives the two-wavelength optical signal P11, the optical transmission device transmits the PTP packet to the time synchronization devices 6-1 and 6-2 in the "reception-side process C" of step S13, and step S13a.

The time synchronization device 6-1 transmits the PTP packet to the optical transmission device 2A-1 in step S21A. Further, the time synchronization device 6-2 transmits the PTP packet to the optical transmission device 2A-2 in step S21B.

The optical transmission device 2A-1 sends the PTP packet received from the time synchronization device 6-1 to the optical transmission device 1A on the master side as a two-wavelength optical signal P21 in the "transmission-side process C" of step S22. Similarly, the optical transmission device 2A-2 sends the PTP packet received from the time synchronization device 6-2 to the optical transmission device 1A on the master side as a two-wavelength optical signal P22 in the "transmission-side process C" of step S22.

When the optical transmission device 1A on the master side receives the PTP packet in the two-wavelength optical signal P21, the optical transmission device 1A transmits the PTP packet to the time synchronization device 5 in the "reception-side process C" of step S23A.

The time synchronization device 5 receives the PTP packet from the optical transmission device 1A in step S24A.

Further, when the optical transmission device 1A on the master side receives the PTP packet with the two-wavelength optical signal P22, the optical transmission device 1A transmits the PTP packet to the time synchronization device 5 in the "reception-side process C" of step S23B. The time synchronization device 5 receives the PTP packet from the optical transmission device 1A in step S24B.

Details of Step S31

Figure 13:
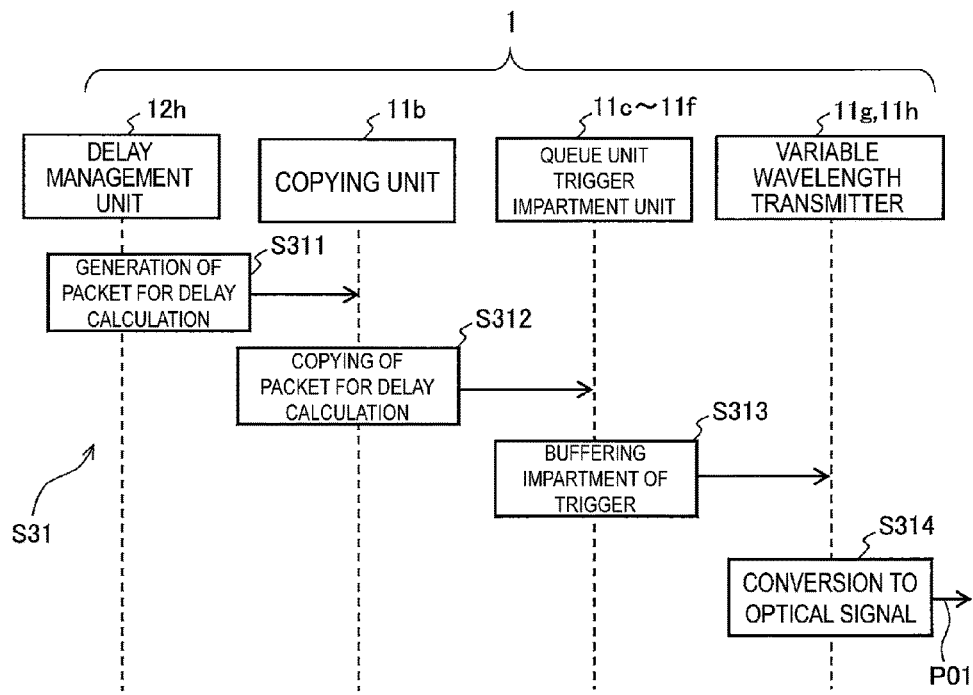
FIG. 13 is a sequence diagram illustrating details of step S31 in FIG. 12.

Details of step S31 in FIG. 12 are illustrated in FIG. 13. The process illustrated in FIG. 13 will be described hereinafter.

The delay management unit 12h provided in the synchronization module 10A in the optical transmission device 1 or 1A generates a unique packet for delay calculation in step S311 and sends the unique packet to the copying unit 11b. The "unique packet" means a packet unique to this device, which differs from the PTP packet, and each packet is configured such that a type of the packet can be distinguished.

The copying unit 11b copies the input unique packet for delay calculation in step S312 to create the two same packets, and sends these packets to the MUX and queue units 11c and 11d.

The MUX and queue units 11c and 11d buffer the input unique packets for delay detection in step S313, and the trigger impartment units 11e and 11f further impart a trigger to outputs thereof and output resultant packets to the variable wavelength transmitters 11g and 11h of two systems, respectively.

The variable wavelength transmitters 11g and 11h convert the input unique packets for delay calculation to optical signals, and simultaneously output the optical signals as the two-wavelength optical signal P01 in step S314.

Details of Step S32

Figure 14:
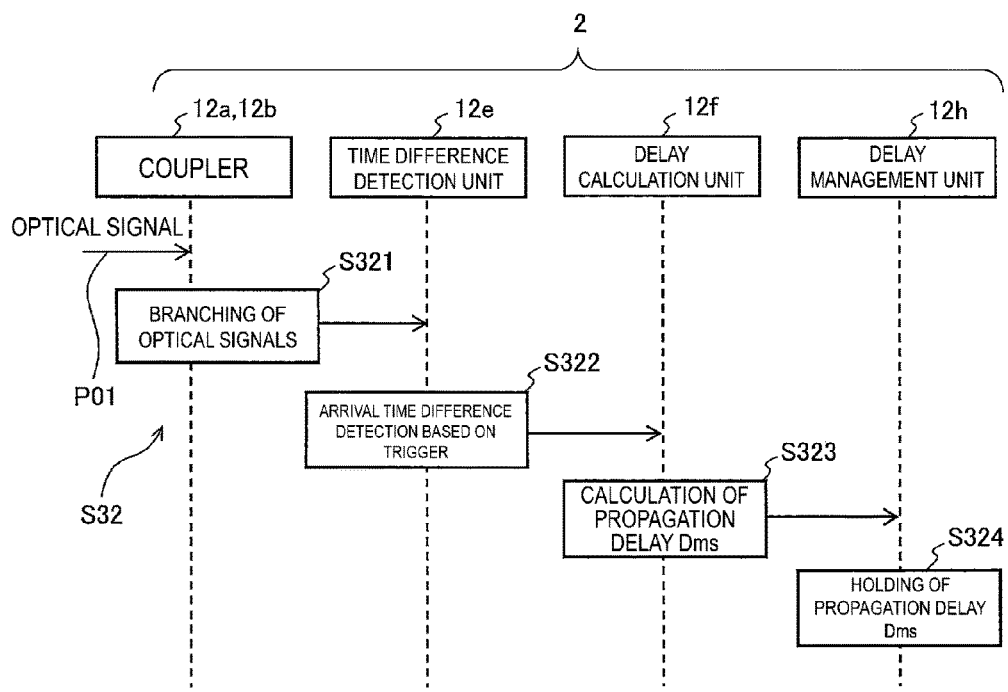
FIG. 14 is a sequence diagram illustrating details of step S32 in FIG. 12.

Details of step S32 in FIG. 12 are illustrated in FIG. 14. A process illustrated in FIG. 14 will be described hereinafter.

The synchronization module 20A in the optical transmission device 2, 2A-1, or 2A-2 includes the optical couplers 12a and 12b, the time difference detection unit 12e, the delay calculation unit 12f, and the delay management unit 12h illustrated in FIG. 14. These perform the process of FIG. 14 as will be described hereinafter.

The optical couplers 12a and 12b receive the two-wavelength optical signals P01 in a state in which the two-wavelength optical signals are demultiplexed for each wavelength, copy these optical signals, branch the optical signals into two directions, and output the optical signals in step S321.

The time difference detection unit 12e detects an arrival time difference at peak positions of waveforms of the two-wavelength optical signals input from the optical couplers 12a and 12b, that is, positions in which the trigger is imparted, in step S322.

The delay calculation unit 12f calculates the propagation delay Dms in the downstream direction in step S323 based on the arrival time difference detected by the time difference detection unit 12e.

The delay management unit 12h receives, holds, and manages the propagation delay Dms in the downstream direction calculated by the delay calculation unit 12f in step S324.

Details of Step S33

Figure 15:
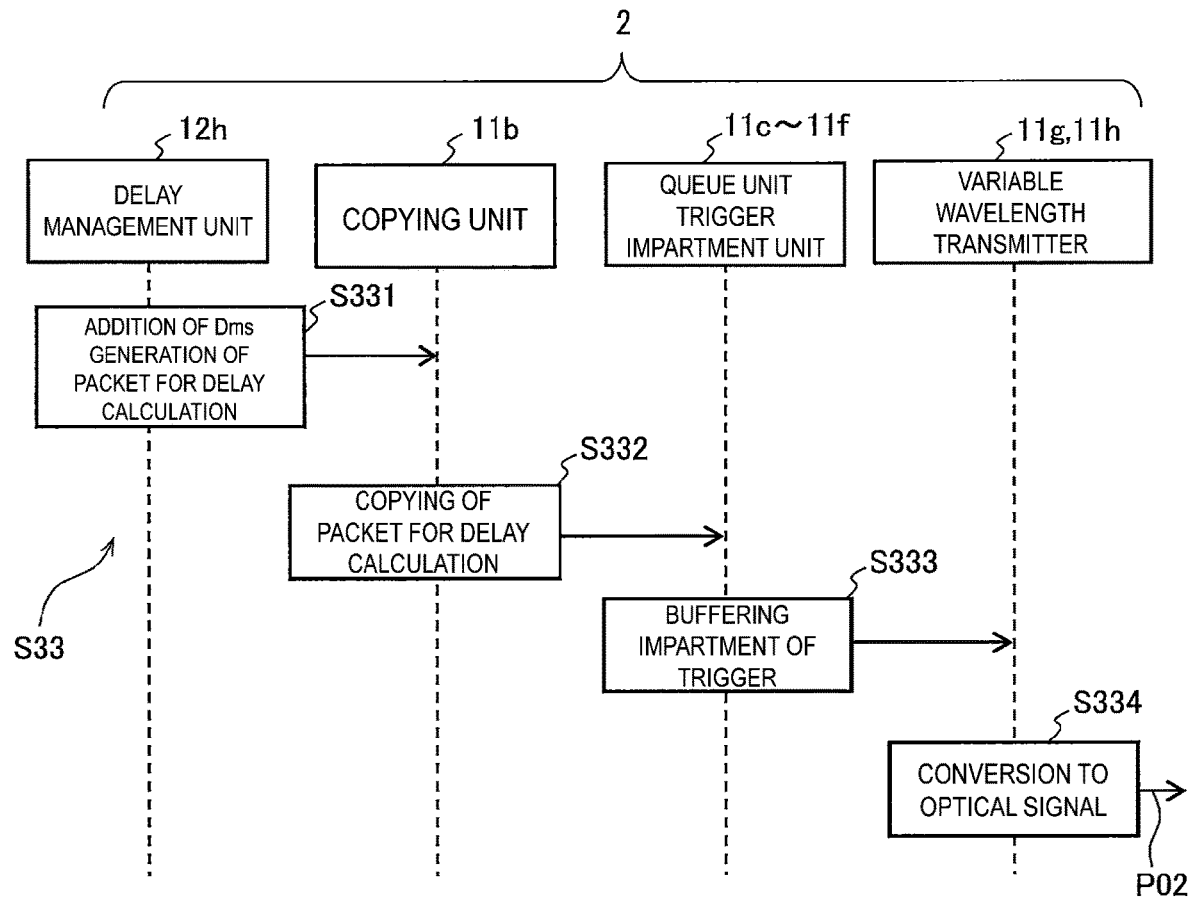
FIG. 15 is a sequence diagram illustrating details of step S33 in FIG. 12.

Details of step S33 in FIG. 12 are illustrated in FIG. 15. A process illustrated in FIG. 15 will be described hereinafter.

The delay management unit 12h, the copying unit 11b, the MUX and queue units 11c and 11d, the trigger impartment units 11e and 11f, and the variable wavelength transmitter 11g and 11h included in the synchronization module 20A in the optical transmission device 2, 2A-1, or 2A-2 perform the process of FIG. 15, as will be described hereinafter.

The delay management unit 12h generates the unique packet for delay calculation and adds information on the already calculated propagation delay Dms to the unique packet for notification in step S331.

The copying unit 11b copies the input unique packets for delay calculation to create the two same packets, and simultaneously applies these packets to inputs of the MUX and queue units 11c and 11d in step S332.

The MUX and queue units 11c and 11d buffer the input unique packets for delay calculation in step S333, and the trigger impartment units 11e and 11f further impart a trigger to outputs thereof and output resultant packets to the variable wavelength transmitters 11g and 11h of two systems, respectively.

The variable wavelength transmitters 11g and 11h convert the input unique packets for delay calculation to optical signals and simultaneously output the optical signals as the two-wavelength optical signals P02 in step S334.

Details of Step S34

Figure 16:
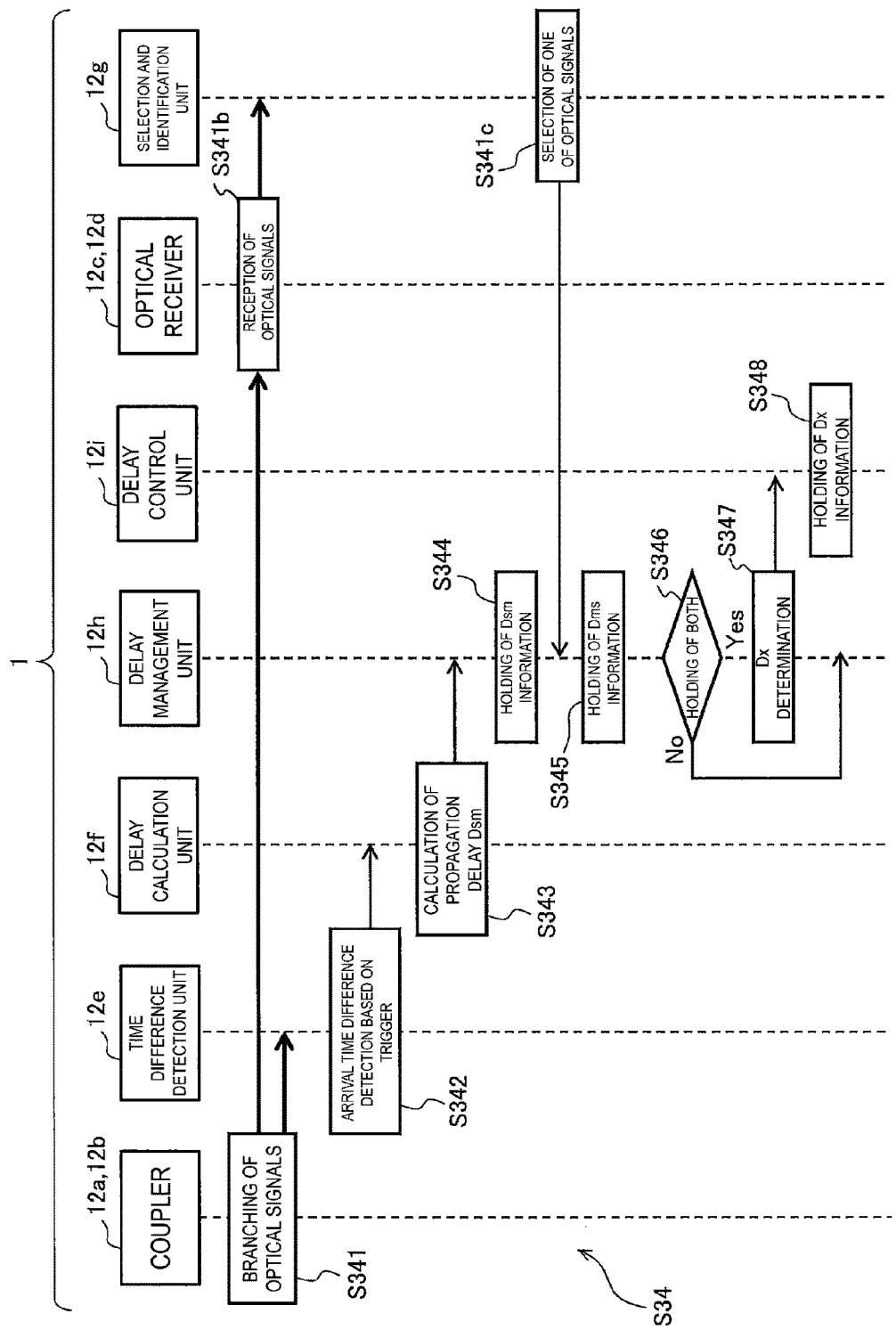
FIG. 16 is a sequence diagram illustrating details of step S34 in FIG. 12.

Details of step S34 in FIG. 12 are illustrated in FIG. 16. A process illustrated in FIG. 16 will be described hereinafter.

The optical couplers 12a and 12b, the time difference detection unit 12e, the delay calculation unit 12f, the delay management unit 12h, the delay amount control unit 12i, and the optical receivers 12c and 12d included in the synchronization module 10A in the optical transmission device 1 or 1A on the master side perform the process of FIG. 16, as will be described hereinafter.

The optical couplers 12a and 12b receive the two-wavelength optical signals P02 in a state in which the two-wavelength optical signals are demultiplexed for each wavelength, copy these optical signals, branch the optical signals into two directions, and output the optical signals in step S341.

The time difference detection unit 12e detects an arrival time difference at peak positions of waveforms of the two-wavelength optical signals input from the optical couplers 12a and 12b, that is, positions in which the trigger is imparted, in step S342.

The delay calculation unit 12f calculates the propagation delay Dsm in the upstream direction in step S343 based on the arrival time difference detected by the time difference detection unit 12e.

The delay management unit 12h receives, holds, and manages the propagation delay Dsm in the upstream direction calculated by the delay calculation unit 12f in step S344.

On the other hand, the unique packets received as the two-wavelength optical signal P02 by the synchronization module 10A are received by the optical receivers 12c and 12d, converted to electrical signal packets, and input to the selection and identification unit 12g in step S341b. The selection and identification unit 12g selects one of the two received packets and applies the packet to the delay management unit 12h in step S341c.

The delay management unit 12h extracts the information on the propagation delay Dms included in the unique packet input from the selection and identification unit 12g from the unique packet and holds the information in step S345.

The delay management unit 12h identifies whether or not the holding of both the two propagation delays Dsm and Dms is completed in step S346. When holding of both is completed, the set delay Dx is determined in the next step S347. That is, a larger value of the two propagation delays Dsm and Dms is defined as the maximum delay Dmax, and a result of adding a margin to the maximum delay Dmax is defined as the set delay Dx. The delay amount control unit 12i holds the set delay Dx determined by the delay management unit 12h in step S348. In each of steps S347 and S348, the maximum delay Dmax may be adopted as it is instead of the set delay Dx, and the waiting time amounts Wms and Wsm may be determined based on the maximum delay Dmax.

Details of Step S35

Figure 17:
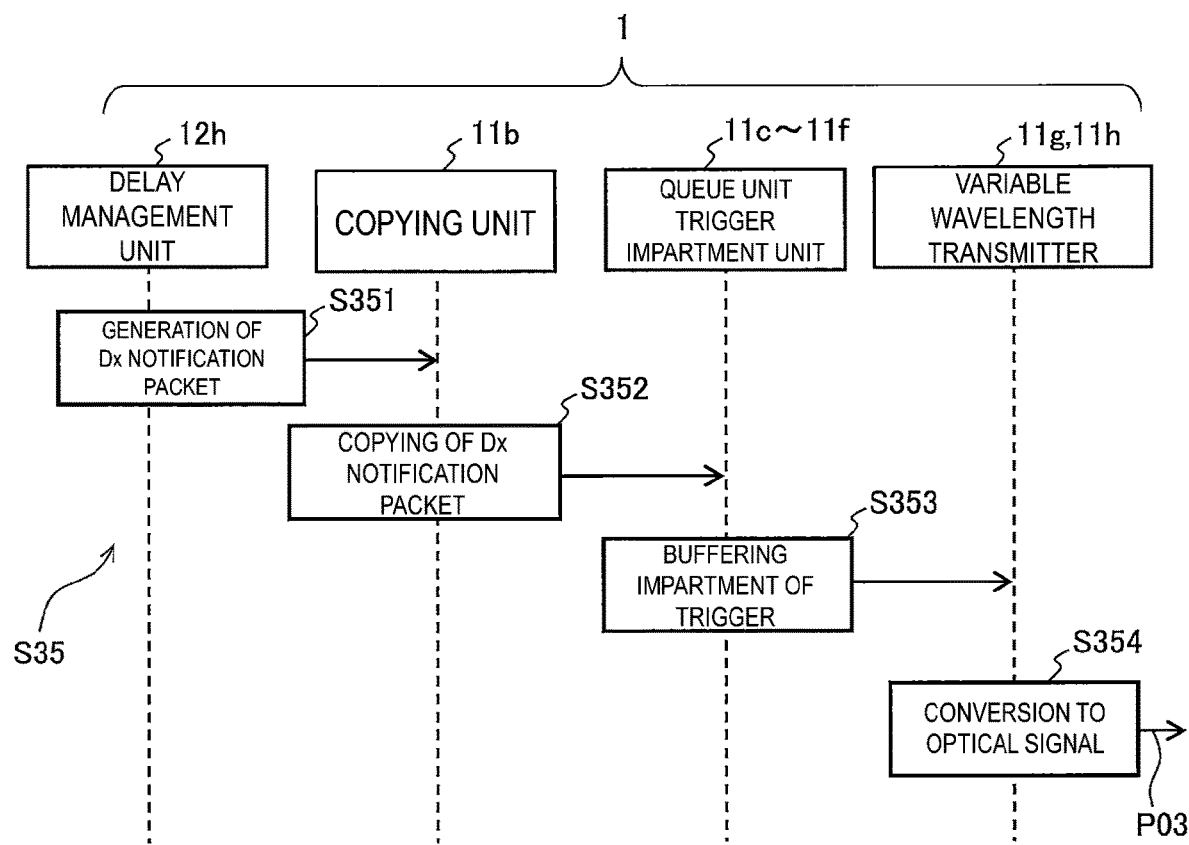
FIG. 17 is a sequence diagram illustrating details of step S35 in FIG. 12.

Details of step S35 in FIG. 12 are illustrated in FIG. 17. A process illustrated in FIG. 17 will be described hereinafter.

The delay management unit 12h, the copying unit 11b, the MUX and queue units 11c and 11d, the trigger impartment units 11e and 11f, and the variable wavelength transmitters 11g and 11h included in the synchronization module 10A in the optical transmission device 1 or 1A on the master side perform the process of FIG. 17, as will be described hereinafter.

The delay management unit 12h generates a unique packet for notification, adds information on the set delay Dx, which has already been determined, to the unique packet, and applies a resultant packet to the copying unit 11b in step S351.

The copying unit 11b copies the input unique packet for notification including the information on the set delay Dx to create the two same packets and simultaneously applies the packets to the inputs of the MUX and queue units 11c and 11d in step S352.

The MUX and queue units 11c and 11d buffer the input unique packets for notification in step S353, and the trigger impartment units 11e and 11f further impart a trigger to outputs thereof and output resultant packets to the variable wavelength transmitters 11g and 11h of two systems, respectively.

The variable wavelength transmitters 11g and 11h each convert the input unique packet for notification to an optical signal and simultaneously output the optical signal as the two-wavelength optical signal P03 in step S354.

Details of Step S36

Figure 18:
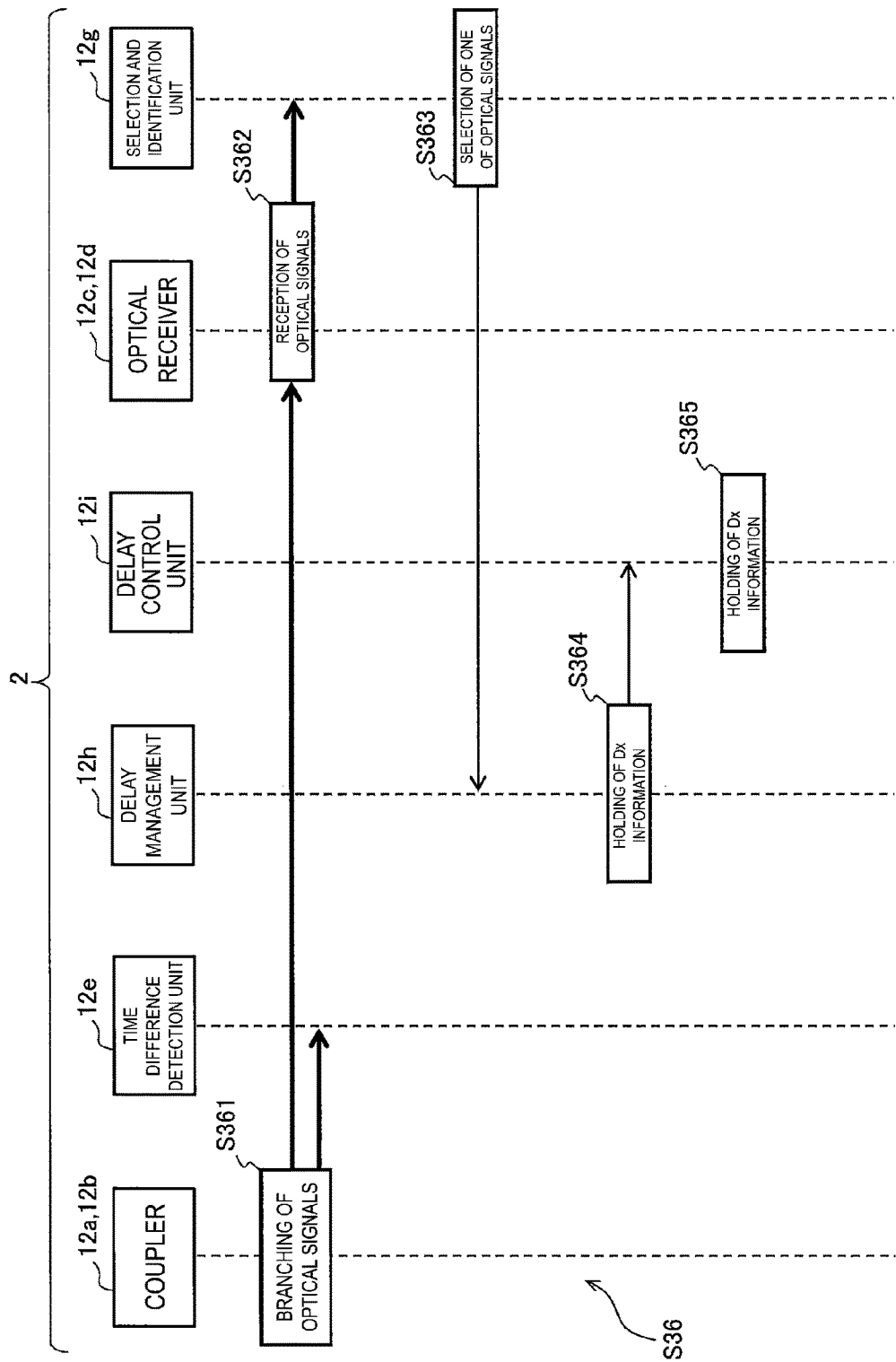
FIG. 18 is a sequence diagram illustrating details of step S36 in FIG. 12.

Details of step S36 in FIG. 12 are illustrated in FIG. 18. A process illustrated in FIG. 18 will be described hereinafter.

The optical couplers 12a and 12b, the time difference detection unit 12e, the delay management unit 12h, the delay amount control unit 12i, the optical receivers 12c and 12d, and the selection and identification unit 12g included in the synchronization module 20A in the optical transmission device 2 or 2A-1 and 2A-2 on the slave side perform a process of FIG. 18 as will be described hereinafter.

The optical couplers 12a and 12b receive the two-wavelength optical signals P03 in a state in which the two-wavelength optical signals are demultiplexed for each wavelength, copy these optical signals, branch the optical signals into two directions, and output the optical signals in step S361. The two sets of branched optical signals are input to the time difference detection unit 12e and the optical receivers 12c and 12d.

The optical receivers 12c and 12d receive the respective input optical signals and output packets of electrical signals in step S362. The packets of the electrical signals output by the optical receivers 12c and 12d are input to the selection and identification unit 12g. The selection and identification unit 12g selects one of the two packets input from the optical receivers 12c and 12d in step S363. The selected packet is input to the delay management unit 12h.

The delay management unit 12h extracts, holds, and manages the information on the set delay Dx included in the packet input from the selection and identification unit 12g in step S364. Further, the extracted information on the set delay Dx is applied to the delay amount control unit 12i. The delay amount control unit 12i acquires and holds the information on the set delay Dx input from the delay management unit 12h.

Details of Step S12

Figure 19:
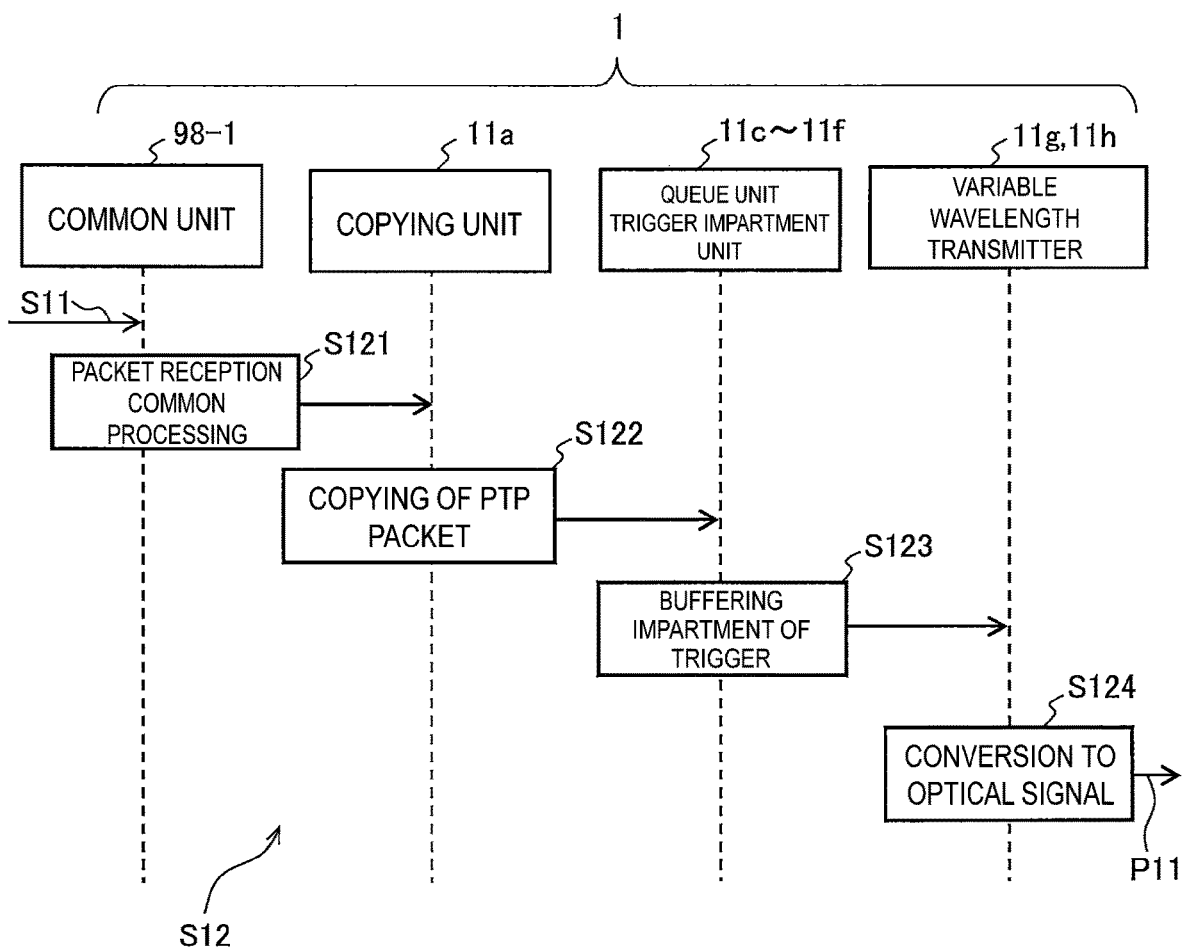
FIG. 19 is a sequence diagram illustrating details of step S12 in FIG. 12.

Details of step S12 in FIG. 12 are illustrated in FIG. 19. A process illustrated in FIG. 19 will be described hereinafter.

The common unit 98-1, the copying unit 11a, the MUX and queue units 11c and 11d, the trigger impartment unit 11e and 11f, and the variable wavelength transmitters 11g and 11h included in the synchronization module 10A in the optical transmission device 1 or 1A on the master side perform the process of FIG. 19 as will be described hereinafter.

When the PTP packet transmitted by the time synchronization device 5 in step S11 is input, the common unit 98-1 receives the PTP packet and performs a predetermined common process in step S121. That is, mutual conversion between the optical signals and the electrical signals, physical layer processing, and media access control are performed. Thus, the PTP packet of the electrical signal is output from the common unit 98-1 and input to the copying unit 11*a*.

The copying unit 11*a* copies the PTP packet input from the common unit 98-1 to create the same two PTP packets, and simultaneously applies these PTP packets to the inputs of the MUX and queue units 11*c* and 11*d* in step S122.

The MUX and queue units 11*c* and 11*d* each receive the input PTP packet and perform a buffering process in step S123. Further, the trigger impartment units 11*e* and 11*f* imparts a trigger to the PTP packet output by the MUX and queue units 11*c* and 11*d*.

The respective PTP packets output in two systems from the trigger impartment units 11*e* and 11*f* are input to the variable wavelength transmitters 11*g* and 11*h*. The variable wavelength transmitters 11*g* and 11*h* convert the input PTP packet to an optical signal in step S124. These optical signals are output as two-wavelength optical signals P11.

Details of Step S13

Figure 20:
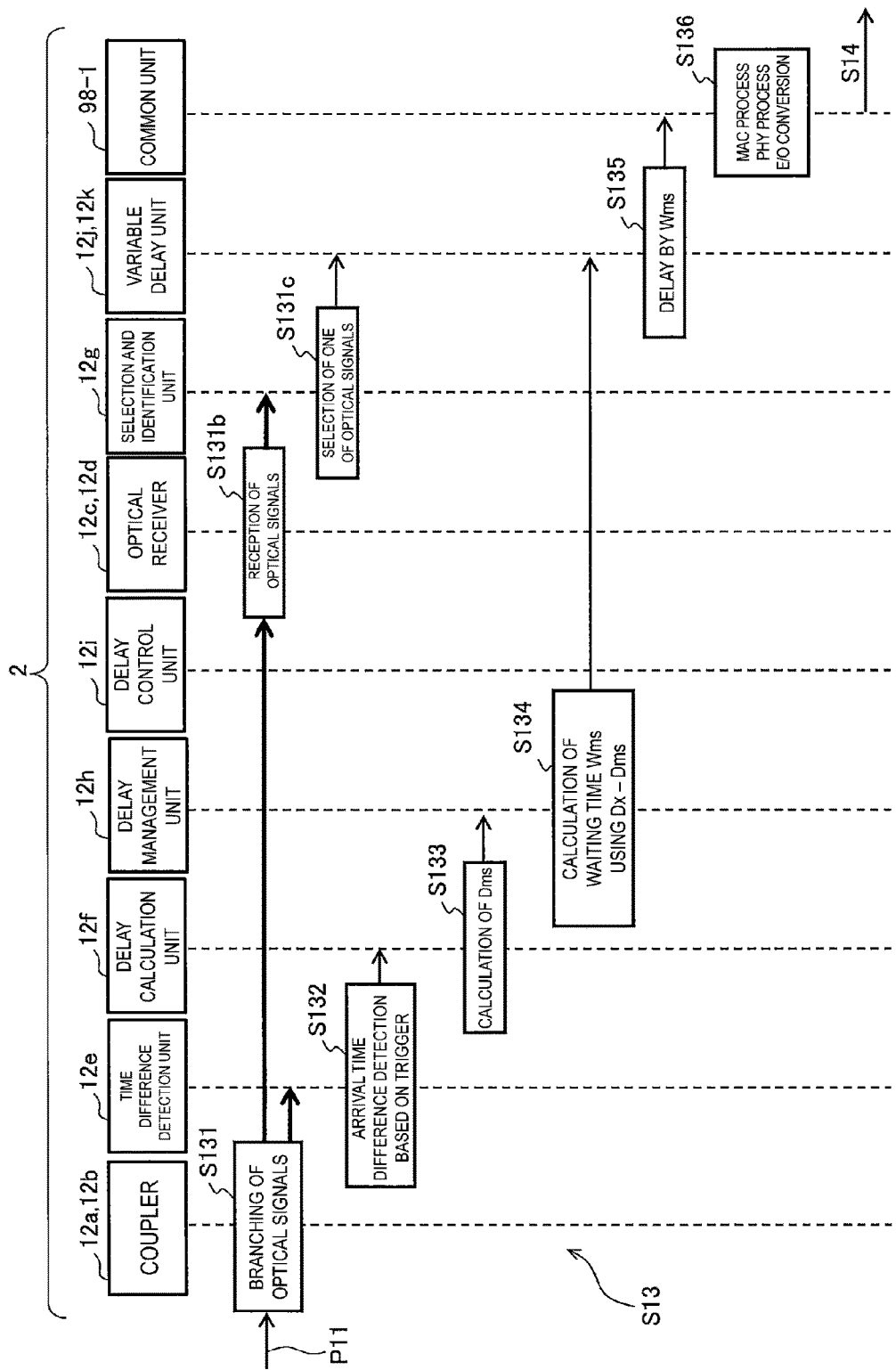
FIG. 20 is a sequence diagram illustrating details of step S13 in FIG. 12.

Details of step S13 in FIG. 12 are illustrated in FIG. 20. A process illustrated in FIG. 20 will be described hereinafter.

The optical couplers 12*a* and 12*b*, time difference detection unit 12*e*, the delay calculation unit 12*f*, the delay management unit 12*h*, the delay amount control unit 12*i*, the optical receivers 12*c* and 12*d*, the selection and identification unit 12*g*, the variable delay units 12*j* and 12*k*, and the common unit 98-1 included in the synchronization module 20A in the optical transmission device 2 or 2A-1 and 2A-2 on the slave side perform the process of FIG. 20, as will be described hereinafter.

The optical couplers 12*a* and 12*b* receive the two-wavelength optical signals P11 in a state in which the two-wavelength optical signals are demultiplexed for each wavelength, copy these optical signals, branch the optical signals into two directions, and output the optical signals in step S131. The two sets of branched optical signals are input to the time difference detection unit 12*e* and the optical receivers 12*c* and 12*d*.

The optical receivers 12*c* and 12*d* receive the respective input optical signals and output packets of electrical signals in step S131*b*. The packets of the electrical signals output by the optical receivers 12*c* and 12*d* are input to the selection and identification unit 12*g*.

The selection and identification unit 12*g* selects one of the two packets input from the optical receivers 12*c* and 12*d* in step S131*c*. The selected packet is input to the variable delay unit 12*j*.

The time difference detection unit 12*e* detects an arrival time difference at peak positions of waveforms of the two-wavelength optical signals input from the optical couplers 12*a* and 12*b*, that is, positions in which the trigger is imparted, in step S132.

The delay calculation unit 12*f* calculates the propagation delay Dms in the downstream direction in step S133 based on the arrival time difference detected by the time difference detection unit 12*e*. The information on the propagation delay Dms calculated by the delay calculation unit 12*f* is input to the delay management unit 12*h*.

In step S134, the delay management unit 12*h* calculates the delay amount corresponding to the waiting time amount Wms using Equation (12) below. Information on the waiting time amount Wms calculated by the delay management unit 12*h* is input to the variable delay unit 12*j*.

$$Wms = Dx - Dms \qquad (12)$$

The variable delay unit 12*j* delays the PIT packet input from the selection and identification unit 12*g* by the waiting time amount Wms according to the information on the waiting time amount Wms input from the delay management unit 12*h* and outputs a resultant PIT packet in step S135. The PTP packet output by the variable delay unit 12*j* is input to the common unit 98-1.

The common unit 98-1 performs a predetermined common process on the PTP packet output from the variable delay unit 12*j* in step S136. That is, a MAC process, a PHY process, and E/O conversion are performed. The PTP packet output from the common unit 98-1 as an optical signal in step S14 is input to the time synchronization device 6-1 or 6-2.

Processing Procedure When Broadcast Communication is Performed

Figure 21:
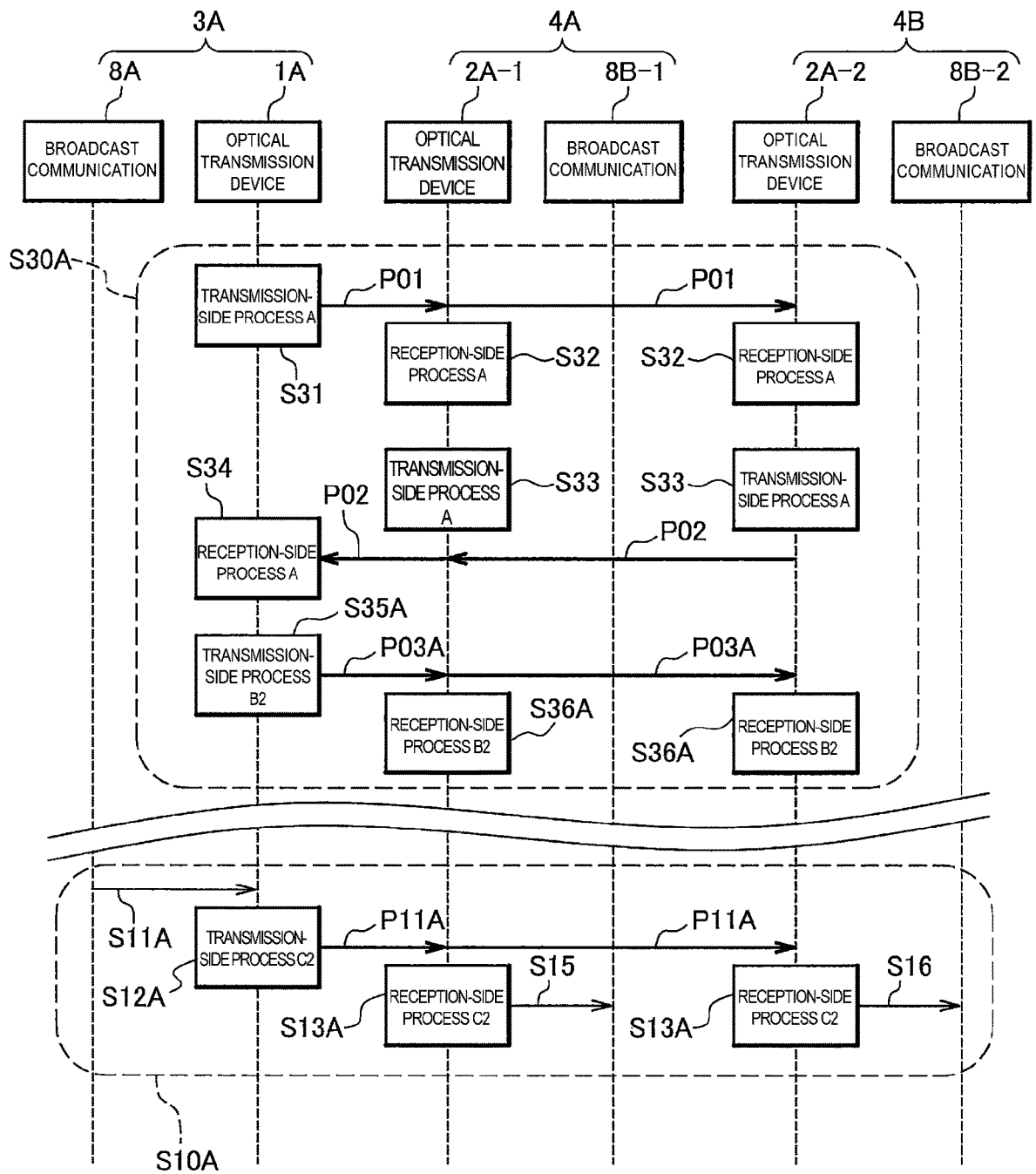
FIG. 21 is a sequence diagram illustrating an overview of an operation procedure when broadcast communication is performed in the communication system illustrated in FIG. 3.

FIG. 21 illustrates an overview of an operation procedure when broadcast communication is performed in the communication system illustrated in FIG. 3. Actually, the synchronization module 10A in the optical transmission device 1A of the master node 3A performs the processes of steps S31, S34, S35A, and S12A in FIG. 21. Further, the synchronization module 20A in the optical transmission device 2A-1 of the slave node 4A performs the processes of steps S32, S33, S36A, and Sl3A in FIG. 21. The same applies to the optical transmission device 2A-2 of the slave node 4B.

The processing procedure illustrated in FIG. 21 will be described hereinafter. The processing procedure illustrated in FIG. 21 is roughly divided into advance preparation 530A and a broadcast communication service traffic accommodation process S10A. Here, it is distinctively characterized in that the upstream and downstream asymmetry in the optical transmission path 7B can be corrected, an optical burst signal is utilized so that the same wavelength of the optical signal to be transmitted can be shared in transmission of the time synchronization signal and transmission of the broadcast packet.

Further, in FIG. 21, the "transmission-side process A" and the "reception-side process A" are processes of calculating the propagation delay in one direction. Further, the "transmission-side process B2" and the "reception-side process B2" are processes of calculating the set delay Dx2 in consideration of a value of the longest propagation delay and notifying of the set delay Dx2. Further, a "transmission-side process C2" and a "reception-side process C2" are processes of equalizing a propagation delay in a downstream direction at each ground at which a process of queueing broadcast communication packets is performed, that is, each node to ensure the simultaneity of communication.

The optical transmission device 1A transmits the two-wavelength optical signal P01 in the "transmission-side process A" of step S31. This two-wavelength optical signal P01 are simultaneously sent to the optical transmission device 2A-1 of the slave node 4A and the optical transmission device 2A-2 of the slave node 4B using a downlink of the optical transmission path 7B including a plurality of wavelengths.

Each of the optical transmission devices 2A-1 and 2A-2 on the slave side receives and processes the two-wavelength optical signal P01 sent from the master side in the "reception-side process A" of step S32.

Each of the optical transmission devices 2A-1 and 2A-2 on the slave side transmits the two-wavelength optical signal P02 in the "transmission-side process A" of the next step S33 based on a processing result of step S32. The two-wavelength optical signal P02 are simultaneously sent to the optical transmission device 1A of the master node 3A using an uplink of the optical transmission path 7B including a plurality of wavelengths.

Further, the two-wavelength optical signal P02 transmitted by the optical transmission device 2A-1 and the two-wavelength optical signal P02 transmitted by the optical transmission device 2A-2 are transmitted as burst signals at shifted timings not to collide with each other. Further, the two-wavelength optical signal P02 transmitted by the optical transmission device 2A-1 includes the propagation delay Dms detected by the optical transmission device 2A-1, and the two-wavelength optical signal P02 transmitted by the optical transmission device 2A-2 includes the propagation delay Dms detected by the optical transmission device 2A-2.

The optical transmission device 1A on the master side receives and processes the two-wavelength optical signals P02 transmitted by the optical transmission devices 2A-1 and 2A-2 on the slave side in the "reception-side process A" in step S34. The optical transmission device 1A on the master side transmits the two-wavelength optical signal P03A in the "transmission-side process B2" of step S35A. This two-wavelength optical signal P03A is used for notifying the slave side of the information on the set delay Dx2 determined by the optical transmission device 1A on the master side.

Each of the optical transmission devices 2A-1 and 2A-2 on the slave side receives and processes the two-wavelength optical signal P03A sent from the master side in the "reception-side process B2" of step S36A. Each of the optical transmission device 2A-1 and 2A-2 can determine the waiting time amount Wms in the downstream direction illustrated in FIG. 2 so that the waiting time amount Wms is adjusted appropriately according to properties of the broadcast communication packet based on the acquired information on the set delay Dx2 and the propagation delay Dms in step S36A.

When the broadcast communication is started, the broadcast communication service device 8A on the master side transmits the broadcast packet as an optical signal in step S11A. This optical signal is input to the synchronization module 10A of the optical transmission device 1A.

The optical transmission device 1A executes the "transmission-side process C2" of step S12A for the broadcast packet transmitted from the broadcast communication service device 8A. Thus, the two-wavelength optical signal P11A including the broadcast packet is transmitted to the respective slave nodes 4A and 4B.

The optical transmission device 2A-1 of the slave node 4A executes the "reception-side process C2" for the two-wavelength optical signal P11A including the input broadcast packet in step S13A. Thus, the broadcast packet is transmitted from the optical transmission device 2A-1 in step S15 and input to the broadcast communication service device 8B-1.

Similarly, the optical transmission device 2A-2 of the slave node 4B executes the "reception-side process C2" for the two-wavelength optical signal P11A including the input broadcast packet in step S13A. Thus, the broadcast packet is transmitted from the optical transmission device 2A-2 in step S16 and input to the broadcast communication service device 8B-2.

Characteristic Configuration of Time Transmission Device and Transmission Method For example, in the communication system illustrated in FIG. 3, the optical transmission devices 1A, 2A-1, 2A-2, and 2A-3 of the respective nodes includes the synchronization modules 10A or 20A. The synchronization module 10A on the master side, for example, transmits the two-wavelength optical signal P01 for delay measurement in the "transmission-side process A" in step S31 of FIG. 12. This step S31 corresponds to a "delay measurement signal generation unit".

Further, the delay management unit 12h in the synchronization module 10A determines the set delay Dx reflecting propagation delays Dms and Dsm calculated based on the arrival time differences Δt12 and Δt21 between a plurality of wavelengths in delay measurement signals received from other nodes via the transmission path, and determines the waiting time amounts Wms and Wsm based on the set delay Dx and the propagation delays Dms and Dsm.

Further, the synchronization module 10A notifies another node of the determined set delay Dx using the two-wavelength optical signal P03, for example, in the "transmission-side process B" of step S35 in FIG. 12. This step S35 corresponds to the "delay value notification unit".

Further, the variable delay unit 12j in each of the synchronization modules 10A and 20A outputs a signal received from another node via the transmission path with a delay of the waiting time amount Wms and Wsm.

Further, the MUX and queue units 11c and 11d in the synchronization module 10A are "intermittent signal generation units". That is, an optical intermittent signal obtained by selecting and multiplexing any of the PTP packet input as time information from the common unit 98-1, the unique packet input from the copying unit 11b as a delay measurement signal, and the broadcast communication packet input from the switch unit 13 is generated using one or more of a plurality of wavelengths.

Further, the selection and identification unit 12g in the synchronization module 20A, that is, the "signal identification unit" has a function of extracting a desired multiplexed signal from the optical intermittent signals included in the received signal.

REFERENCE SIGNS LIST 1, 2 Optical transmission device
3, 3A Master node
4, 4A, 4B, 4C Slave node
5, 6, 6-1, 6-2, 6-3 Time synchronization device
7A, 7B Optical transmission path
7Ams Downstream transmission path
7Asm Upstream transmission path
7Ba, 7Bb Transmission path connection end
8A, 8B-1, 8B-2, 8B-3 Broadcast communication service device
10, 10A, 20, 20A, 20A-1, 20A-2 Synchronization module
10Aa, 20Aa Transmission processing unit
10Ab, 20Ab Reception processing unit
11a, 11b Copying unit
11c, 11d MUX and queue unit
11e, 11f Trigger impartment unit
11g, 11h Variable wavelength transmitter
12a, 12b Optical coupler
12c, 12d Optical receiver 12e Time difference detection unit
12f Delay calculation unit
12g Selection and identification unit
12h Delay management unit
12i Delay amount control unit
12j, 12k Variable delay unit
13 Switch unit
14 Clock timer
15 Environmental information management unit
16 Demultiplexer
91, 91A, 91B Transponder
92, 92A, 92B Multiplexer
93, 93A, 93B Demultiplexer
94, 94A Optical cross-connect
95, 95A, 95B, 96, 96A, 96B Optical amplifier
97, 97A, 97B Optical monitoring unit
98, 98-1, 98-2, 98-3 Common unit
Dms, Dsm Propagation delay
Dx Set delay
P1A, P1B, P3A, P3B Transmission-end optical signal
P2A, P2B, P4A, P4B Reception-end optical signal
P01, P02, P03, P11, P22 Two-wavelength optical signal

The invention claimed is:

1. A time transmission device including an optical transmission unit connected to any node position on a transmission path in which bidirectional optical communication in downstream and upstream directions is possible, and a time synchronization unit configured to transmit, between a plurality of nodes, time information for correcting a time deviation between the plurality of nodes, the time transmission device comprising:
   a delay measurement signal generation unit configured to simultaneously transmit a plurality of signals having different wavelengths as delay measurement signals to the transmission path;
   a delay management unit configured to determine a delay value reflecting a propagation delay calculated based on an arrival time difference between a plurality of wavelengths in the delay measurement signals received from another node of the plurality of nodes via the transmission path, and determine a waiting time amount based on the delay value and the propagation delay;
   a delay value notification unit configured to notify the other node of the plurality of nodes of the delay value;
   a variable delay unit configured to output signals received from the other node of the plurality of nodes via the transmission path with a delay of the waiting time amount;
   an intermittent signal generation unit configured to: (i) generate an optical intermittent signal obtained by periodically selecting and multiplexing at least any of the time information, the delay measurement signal, and desired communication information using one or more of a plurality of wavelengths and (ii) reflect a difference in priority by the plurality of signals to be transmitted and buffer and multiplex a plurality of types of input signals; and
   a signal identification unit configured to extract a desired multiplexed signal from the optical intermittent signals included in a received signal.

2. The time transmission device according to claim 1, further comprising:
   a broadcast communication signal processing unit configured to allow connection with a broadcast communication device configured to generate broadcast communication information a destination of which is each of the other nodes of the plurality of nodes,
   wherein the delay management unit manages the propagation delay and the delay value independently of each other for each of the other nodes of the plurality of nodes.

3. The time transmission device according to claim 1,
   wherein a plurality of independent synchronization modules, each including the delay measurement signal generation unit, the delay management unit, and the variable delay unit, are connected to the plurality of nodes, respectively,
   a first synchronization module is connected to a master node,
   a second synchronization module is connected to a plurality of slave nodes, and
   the first synchronization module manages the propagation delay and the delay value of the second synchronization module at each of the plurality of slave nodes.

4. The time transmission device according to claim 3, wherein the first synchronization module and a plurality of the second synchronization modules are connected to each other via the transmission path formed in a ring shape.

5. The time transmission device according to claim 3,
   wherein the first synchronization module collects information on the propagation delay with respect to a signal in a direction from the master node to each of the plurality of slave node, from each of the second synchronization modules,
   the first synchronization module calculates, by itself, information on the propagation delay with respect to a signal in a direction from each of the plurality of slave nodes to the master node for each of the plurality of slave nodes, and
   the first synchronization module notifies each of second synchronization modules of information on the waiting time amount calculated based on the propagation delay by types of signal to be transmitted.

6. The time transmission device according to claim 5, wherein the second synchronization module determines a delay time in the variable delay unit by types of signal to be received, based on the information on the waiting time amount which the first synchronization module notifies the second synchronization module of.

7. A transmission method for transmitting time information for correcting a time deviation between a plurality of nodes between a plurality of optical transmission devices connected to any node position on a transmission path in which bidirectional optical communication in downstream and upstream directions is possible, the transmission method comprising:
   simultaneously transmitting, by an optical transmission device of the plurality of nodes at its own node position, a plurality of signals having different wavelengths as delay measurement signals to the transmission path;
   determining, by an optical transmission device of the plurality of optical transmission devices that is connected to at least one node, a waiting time amount based on a delay value and a propagation delay by determining the delay value reflecting the propagation delay calculated based on an arrival time difference between a plurality of wavelengths in the delay measurement signals received from another node of the plurality of nodes via the transmission path;

notifying, by the optical transmission device of the plurality of optical transmission devices that is connected to at least one node, the other node of the plurality of nodes of the delay value;

outputting, by the optical transmission device of the plurality of nodes at its own node position, signals received from the other node of the plurality of nodes via the transmission path with a delay of the waiting time amount;

generating, by the optical transmission device of the plurality of optical transmission devices that is connected to at least one node, an intermittent signal obtained by periodically selecting and multiplexing at least any of the time information, the delay measurement signal, and desired communication information using one or more of a plurality of wavelengths;

reflecting, by an optical transmission device of the plurality of nodes at its own node position, a difference in priority by the plurality of signals to be transmitted;

multiplexing, by an optical transmission device of the plurality of nodes at its own node position, a plurality of types of input signals; and extracting a desired multiplexed signal from the intermittent signals included in a received signal.

8. The transmission method according to claim 7, further comprising:

allowing, by an optical transmission device of the plurality of nodes at its own node position, connection with a broadcast communication device configured to generate broadcast communication information a destination of which is each of the other nodes of the plurality of nodes, managing, by an optical transmission device of the plurality of nodes at its own node position, the propagation delay and the delay value independently of each other for each of the other nodes of the plurality of nodes.

9. The transmission method according to claim 7, further comprising:

wherein a plurality of independent synchronization modules, each including a delay measurement signal generation unit, a delay management unit, and a variable delay unit, are connected to the plurality of nodes, respectively, a first synchronization module is connected to a master node, a second synchronization module is connected to a plurality of slave nodes, and managing, by the first synchronization module, the propagation delay and the delay value of the second synchronization module at each of the plurality of slave nodes.

10. The transmission method according to claim 9, further comprising:

connecting the first synchronization module and a plurality of second synchronization modules to each other via the transmission path formed in a ring shape.

11. The transmission method according to claim 9, further comprising:

collecting, by the first synchronization module, information on the propagation delay with respect to a signal in a direction from the master node to each of the plurality of slave node, from each of the second synchronization modules, calculating, by the first synchronization module, information on the propagation delay with respect to a signal in a direction from each of the plurality of slave nodes to the master node for each of the plurality of slave nodes, and notifying, by the first synchronization module, each of the second synchronization modules of information on the waiting time amount calculated based on the propagation delay by types of signal to be transmitted.

12. The transmission method according to claim 11, further comprising:

determining, by the second synchronization module, a delay time in the variable delay unit by types of signal to be received, based on the information on the waiting time amount which the first synchronization module notifies the second synchronization module of.

13. A communication system comprising:

a time transmission device including an optical transmission unit connected to any node position on a transmission path in which bidirectional optical communication in downstream and upstream directions is possible, and a time synchronization unit configured to transmit, between a plurality of nodes, time information for correcting a time deviation between the plurality of nodes, the time transmission device comprising:

a delay measurement signal generation unit configured to simultaneously transmit a plurality of signals having different wavelengths as delay measurement signals to the transmission path;

a delay management unit configured to determine a delay value reflecting a propagation delay calculated based on an arrival time difference between a plurality of wavelengths in the delay measurement signals received from another node of the plurality of nodes via the transmission path, and determine a waiting time amount based on the delay value and the propagation delay;

a delay value notification unit configured to notify the other node of the plurality of nodes of the delay value;

a variable delay unit configured to output signals received from the other node of the plurality of nodes via the transmission path with a delay of the waiting time amount;

an intermittent signal generation unit configured to: (i) generate an optical intermittent signal obtained by periodically selecting and multiplexing at least any of the time information, the delay measurement signal, and desired communication information using one or more of a plurality of wavelengths and (ii) reflect a difference in priority by the plurality of signals to be transmitted and buffer and multiplex a plurality of types of input signals; and a signal identification unit configured to extract a desired multiplexed signal from the optical intermittent signals included in a received signal.

14. The communication system according to claim 13, further comprising:

a broadcast communication signal processing unit configured to allow connection with a broadcast communication device configured to generate broadcast communication information a destination of which is each of the other nodes of the plurality of nodes, wherein the delay management unit manages the propagation delay and the delay value independently of each other for each of the other nodes of the plurality of nodes.

15. The communication system according to claim 13, wherein a plurality of independent synchronization modules, each including the delay measurement signal generation unit, the delay management unit, and the variable delay unit, are connected to the plurality of nodes, respectively, a first synchronization module is connected to a master node, a second synchronization module is connected to a plurality of slave nodes, and the first synchronization module manages the propagation delay and the delay value of the second synchronization module at each of the plurality of slave nodes.

16. The communication system according to claim 15, wherein the first synchronization module and a plurality of the second synchronization modules are connected to each other via the transmission path formed in a ring shape.

17. The communication system according to claim 15, wherein the first synchronization module collects information on the propagation delay with respect to a signal in a direction from the master node to each of the plurality of slave node, from each of the second synchronization modules, the first synchronization module calculates, by itself, information on the propagation delay with respect to a signal in a direction from each of the plurality of slave nodes to the master node for each of the plurality of slave nodes, and the first synchronization module notifies each of second synchronization modules of information on the waiting time amount calculated based on the propagation delay by types of signal to be transmitted.

\* \* \* \* \*